US012780247B2

(12) United States Patent
Klaus et al.

(10) Patent No.: US 12,780,247 B2
(45) Date of Patent: Nov. 3, 2026

(54) SURFACE ESTIMATION

(71) Applicant: NVIDIA CORPORATION, Santa Clara, CA (US)

(72) Inventors: Andreas Klaus, Graz (AT); Gerald Schweighofer, Blaindorf (AT); Joachim Pehserl, Lynnwood, WA (US); Joachim Bauer, Graz (AT)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/987,216

(22) Filed: Dec. 19, 2024

(65) Prior Publication Data

US 2025/0381980 A1 Dec. 18, 2025

Related U.S. Application Data

(63) Continuation of application No. 18/987,171, filed on Dec. 19, 2024.

(Continued)

(51) Int. Cl.
*B60W 60/00* (2020.01)
*G01S 17/89* (2020.01)

(52) U.S. Cl.
CPC ........... *B60W 60/001* (2020.02); *G01S 17/89* (2013.01); *B60W 2420/408* (2024.01)

(58) Field of Classification Search
None
See application file for complete search history.

(56) References Cited

U.S. PATENT DOCUMENTS 10,885,698 B2 1/2021 Muthler et al.
11,657,532 B2 5/2023 Park et al.
(Continued)

FOREIGN PATENT DOCUMENTS

CN 110501024 A 11/2019
CN 118069277 A 5/2024
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Arslan Azhar
(74) *Attorney, Agent, or Firm* — Freestone Intellectual Property Law PLLC

(57) ABSTRACT

Embodiments of the present disclosure relate to surface estimation using stereo imaging and surface disparities. For example, a three-dimensional (3D) surface structure may be modeled as a disparity field, and a surface disparity field representing a surface in the environment (e.g., the ground) may be generated using a constrained nonlinear hierarchical optimization to process stereo image data and iteratively refine estimated surface disparity values based on weights that guide the optimization to expected surface values (e.g., ground, road). The resulting surface (e.g., ground) disparity field may be used for a variety of downstream tasks, such as obstacle detection, segmentation of a navigable space, ego-motion refinement, and/or generation of an estimated surface profile.

20 Claims, 20 Drawing Sheets

Related U.S. Application Data

(60) Provisional application No. 63/659,173, filed on Jun. 12, 2024.

(56) References Cited

U.S. PATENT DOCUMENTS

| | | | |
|---|---|---|---|
| 2004/0130702 | A1 | 7/2004 | Jupp et al. |
| 2015/0103331 | A1 | 4/2015 | Oh et al. |
| 2015/0123995 | A1 | 5/2015 | Zavodny et al. |
| 2017/0137023 | A1* | 5/2017 | Anderson ............. B60W 50/14 |
| 2017/0297564 | A1* | 10/2017 | Xi ................... B60W 30/18145 |
| 2017/0344018 | A1 | 11/2017 | Song et al. |
| 2017/0359561 | A1 | 12/2017 | Vallespi-Gonzalez |
| 2019/0001965 | A1* | 1/2019 | Cho .................... B60W 30/025 |
| 2019/0101649 | A1 | 4/2019 | Jensen |
| 2019/0162823 | A1 | 5/2019 | Eckstein et al. |
| 2019/0212422 | A1 | 7/2019 | Yang et al. |
| 2020/0074266 | A1 | 3/2020 | Peake et al. |
| 2020/0333466 | A1 | 10/2020 | Hansen et al. |
| 2021/0026355 | A1 | 1/2021 | Chen et al. |
| 2021/0150720 | A1 | 5/2021 | Kumar et al. |
| 2021/0263135 | A1 | 8/2021 | Chen et al. |
| 2021/0304380 | A1 | 9/2021 | Richert et al. |
| 2021/0389469 | A1 | 12/2021 | Sakata et al. |
| 2022/0075034 | A1 | 3/2022 | Kim et al. |
| 2022/0180578 | A1 | 6/2022 | Peterson |
| 2022/0250624 | A1 | 8/2022 | Park et al. |
| 2022/0270282 | A1 | 8/2022 | Akutsu et al. |
| 2022/0283274 | A1 | 9/2022 | Kim et al. |
| 2023/0204737 | A1 | 6/2023 | Jain et al. |
| 2023/0281843 | A1 | 9/2023 | Wu et al. |
| 2023/0332925 | A1 | 10/2023 | Yox et al. |
| 2024/0027622 | A1 | 1/2024 | Ferroni et al. |
| 2024/0028041 | A1 | 1/2024 | Klaus et al. |
| 2024/0069563 | A1 | 2/2024 | Kwon et al. |
| 2024/0161517 | A1 | 5/2024 | Li et al. |
| 2024/0210542 | A1 | 6/2024 | Turpin et al. |
| 2024/0257394 | A1 | 8/2024 | Hasnain et al. |
| 2024/0371035 | A1 | 11/2024 | Jadhav et al. |
| 2024/0385300 | A1 | 11/2024 | Aghaei et al. |
| 2025/0171028 | A1 | 5/2025 | Vijayan et al. |
| 2025/0294656 | A1* | 9/2025 | Alexander ............. B60Q 1/503 |
| 2025/0342668 | A1 | 11/2025 | Faraguna |
| 2026/0043922 | A1 | 2/2026 | Lee |

FOREIGN PATENT DOCUMENTS

| | | | |
|---|---|---|---|
| CN | 119779403 | A | 4/2025 |
| EP | 4006588 | A1 | 6/2022 |
| WO | 02065153 | A1 | 8/2002 |

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Non-Final Office Action, U.S. Appl. No. 18/987,171, Notification Date: Apr. 19, 2026, 19 pages.

Ex Parte Quayle Action, U.S. Appl. No. 18/987,216, Notification Date: May 7, 2026, 8 pages.

Non-Final Office Action, U.S. Appl. No. 18/987,228, Notification Date: May 12, 2026, 26 pages.

Notice of Allowance, U.S. Appl. No. 18/987,216, Notification Date: Jun. 10, 2026, 10 pages.

* cited by examiner

1400

SURFACE ESTIMATION

CROSS-REFERENCE TO RELATED APPLICATIONS

This application is a continuation of U.S. application Ser. No. 18/987,171, filed on Dec. 19, 2024, which claims the benefit of U.S. Provisional Application No. 63/659,173, filed on Jun. 12, 2024. The contents of each of the foregoing are hereby incorporated by reference in their entirety.

BACKGROUND

Designing a system to drive a vehicle autonomously, safely, and comfortably without supervision is tremendously difficult. An autonomous vehicle should at least be capable of performing as a functional equivalent of an attentive driver—who draws upon a perception and action system that has an incredible ability to identify and react to dynamic and static hazards in a complex environment—to navigate along the path of the vehicle through the surrounding three-dimensional (3D) environment. The ability to estimate surfaces is often critical for autonomous driving perception systems. For example, an estimated ground surface may be used for tasks such as identifying a navigable space (e.g., the road surface), detecting obstacles on the road surface, adjusting the suspension or other vehicle components for a smoother ride, and estimating the height of obstacles, to name a few examples.

As such, various autonomous vehicle and advanced driver assistance functions may rely on ground or road surface estimates. However, the way these functions perform is limited by the accuracy of the estimated surface. For example, subtle variations in road height may be used to optimize suspension settings, but when the estimated height of the road surface lacks sufficient precision, small but impactful variations in road contours can go undetected, leading to poor handling on uneven or rough surfaces and potentially compromising the stability of a vehicle, especially at higher speeds.

Conventional techniques for estimating road surfaces have limited accuracy. Detecting road surface profiles farther out from the vehicle is particularly challenging due to the inherent limitations of current sensor technologies. LiDAR, which uses laser pulses to create detailed 3D representations of the environment, often provides good accuracy at close range, but produces sparse data points at greater distances. The sparsity of the LiDAR data may be further limited by weather conditions (e.g., resulting in few or even no measurements on wet roads), leading to incomplete and less reliable representations. On the other hand, RADAR, which uses radio waves to detect objects and measure distances, can operate effectively over long ranges and in various weather conditions, but its resolution is lower, making it difficult to estimate surfaces with sufficient precision. Conventional camera-only solutions offer high-resolution images of the surrounding environment, but these solutions struggle to estimate distances to surfaces with sufficient precision, especially for farther measurement ranges.

As such, there is a need for improved surface estimation techniques.

SUMMARY

Embodiments of the present disclosure relate to ground surface estimation using localized surface fitting, bias correction, stereo imaging, and/or ground disparities for autonomous and semi-autonomous systems and applications.

In some embodiments, a three-dimensional (3D) surface structure (e.g., a road surface profile) may be estimated using a nonlinear optimization to fit height values to (e.g., accumulated, bias-corrected) LiDAR detections (e.g., sampled in localized regions along one or more predicted trajectories). For example, one or more LiDAR sensors of an ego-machine may be used to generate LiDAR data while the ego-machine navigates through an environment, a 3D representation of the ground or road surface may be estimated based on the LiDAR data, and a ground or road surface profile along one or more predicted trajectories (e.g., the wheel tracks) may be estimated based on the LiDAR data and the estimated ground or road surface. For example, in some embodiments, LiDAR data (e.g., detected 3D point clouds) may be ego-motion compensated, corrected for measurement bias, accumulated, and sampled along one or more predicted trajectories, and the height of each trajectory point may be fitted to the heights of the corresponding sampled points using a nonlinear optimization. As such, the resulting road surface profile (e.g., modeled along the wheel track(s)) may be provided to an adaptive suspension control system to modulate the damping characteristic of the suspension system to counteract indentations (e.g., potholes, drainage canals, etc.) or protrusions (e.g., speed bumps, metal plates, etc.) represented in the road surface profile.

In some embodiments, a LiDAR measurement bias such as a range-dependent height offset and/or a reflectivity-dependent height offset may be estimated in an offline process, and measured LiDAR heights may be compensated by removing the bias. To estimate a range-dependent height bias, observed height values representing a fixed location (e.g., a patch on the ground) in an accumulated LiDAR point cloud may be binned by measurement range, and a height bias or offset for each range bin may be calculated based on the difference between a combined height value for that bin and some designated ground truth height. To estimate a reflectivity-dependent height bias, one or more locations (e.g., patches on the ground) represented in an accumulated LiDAR point cloud with sufficient variation in reflectivity may be identified (e.g., local neighborhoods with high reflectivity paired with low reflectivity of the ground surface tarmac, such as local neighborhood of road marks), and observed height values that were measured from approximately the same range may be binned based on measured reflectivity. As such, the observed height values in each binned reflectivity band may be combined (e.g., taking the median height), and the height bias or offset for each reflectivity bin may be calculated based on the difference between the combined height value for that bin and some designated ground truth height. The estimated biases may be stored in any suitable way (e.g., in one or more look up tables, indexed by range and/or reflectivity), and LiDAR points measured during an online process may be compensated by looking up and subtracting a range-dependent height bias corresponding to the measured range, and/or by looking up and subtracting a reflectivity-dependent height bias corresponding to the measured reflectivity.

In some embodiments, the 3D surface structure may be modeled as a disparity field, and a surface disparity field representing a surface in the environment (e.g., the ground) may be generated using a constrained nonlinear hierarchical optimization to process stereo image data and iteratively refine estimated surface disparity values based on weights that guide the optimization to expected surface values (e.g., ground, road). More specifically, one or more stereo cameras of an ego-machine may be used to generate pairs of stereo images while the ego-machine navigates through an environment, each stereo image pair may be used to generate a stereo disparity field comprising stereoscopic disparity values (also known as stereo parallax), and a surface disparity field representing a surface in the environment (e.g., the ground) may be generated by iteratively refining estimated disparity values using a constrained nonlinear optimization process that is tailored with one or more weights to directly solve for the disparity field of the surface such as the ground (the ground disparity field). The resulting surface (e.g., ground) disparity field may be used for a variety of downstream tasks, such as obstacle detection, segmentation of a navigable space, ego-motion refinement, and/or generation of an estimated surface profile.

Accordingly, the techniques described herein may be used to estimate the 3D structure of a surface such as the ground or road surface, detect obstacles in the environment, and/or detect a navigable space, and a representation of the detection(s) may be provided to an autonomous vehicle drive stack to enable safe and comfortable planning and control of the autonomous vehicle.

BRIEF DESCRIPTION OF THE DRAWINGS

The present systems and methods for ground surface estimation using localized surface fitting, bias correction, stereo imaging, and/or ground disparities for autonomous and semi-autonomous systems and applications are described in detail below with reference to the attached drawing figures, wherein.

DETAILED DESCRIPTION

Figure 1:
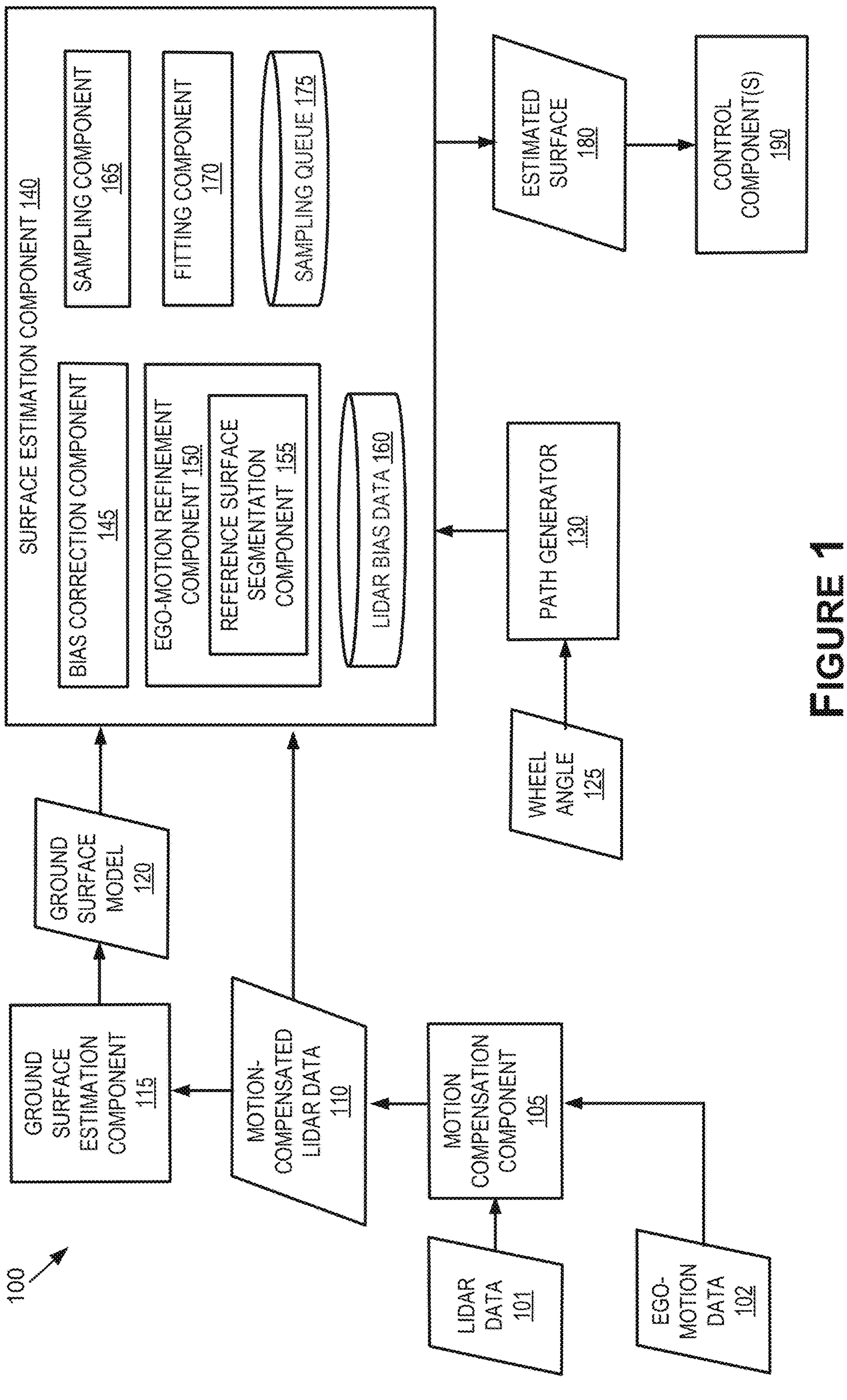
FIG. 1 is a data flow diagram illustrating an example surface estimation pipeline, in accordance with some embodiments of the present disclosure.

Systems and methods are disclosed related to ground surface estimation using localized surface fitting, bias correction, stereo imaging, and/or ground disparities for autonomous and semi-autonomous systems and applications. In some embodiments, a three-dimensional (3D) surface structure (e.g., a road surface profile) may be estimated using a nonlinear optimization to fit height values to (e.g., accumulated, bias-corrected) LiDAR detections (e.g., sampled in localized regions along one or more predicted trajectories). In some embodiments, the 3D surface structure may be modeled as a disparity field, and a surface disparity field representing a surface in the environment (e.g., the ground) may be generated using a constrained nonlinear hierarchical optimization to process stereo image data and iteratively refine estimated surface disparity values based on weights that guide the optimization to expected surface values (e.g., ground, road). The present techniques may be used by autonomous vehicles, semi-autonomous vehicles, robots, and/or other object or machine types to estimate a 3D surface structure of a navigable space or other component of an environment, and/or detect and avoid potential obstacles based on the estimated 3D surface structure.

Although the present disclosure may be described with respect to an example autonomous or semi-autonomous vehicle or machine 1500 (alternatively referred to herein as "vehicle 1500" or "ego-machine 1500," an example of which is described with respect to FIGS. 15A-15D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to road surface estimation for autonomous driving, this is not intended to be limiting, and the systems and methods described herein may be used in augmented reality, virtual reality, mixed reality, robotics, security and surveillance, autonomous or semi-autonomous machine applications, and/or any other technology spaces where surface estimation may be used.

In some embodiments, one or more LiDAR sensors of an ego-machine may be used to generate LiDAR data while the ego-machine navigates through an environment, a 3D representation of the ground or road surface may be estimated based on the LiDAR data, and a ground or road surface profile along one or more predicted trajectories (e.g., the wheel tracks) may be estimated based on the LiDAR data and the estimated ground or road surface. For example, in some embodiments, LiDAR data (e.g., detected 3D point clouds) may be ego-motion compensated, accumulated, and sampled along one or more predicted trajectories, and the height of each trajectory point may be fitted to the heights of the corresponding sampled points using a nonlinear optimization. As such, the resulting road surface profile (e.g., modeled along the wheel track(s)) may be provided to an adaptive suspension control system to modulate the damping characteristic of the suspension system to counteract indentations (e.g., potholes) or protrusions (e.g., speed bumps) represented in the road surface profile.

One possible way to increase the accuracy and robustness of the estimated road surface profile is to create a sufficiently dense point cloud for the optimization step, such that each point in the road surface profile has a minimum number of contributing LiDAR points. With a single LiDAR frame (e.g., a point cloud produced from a single LiDAR spin), the achievable density on the road surface is usually too low for a robust estimation. As such, in some embodiments, multiple frames of LiDAR data may be accumulated using an ego-motion compensation process that identifies transformations that map point clouds from successive LiDAR frames to a common coordinate system, and the accuracy of the transformations may be refined using a multi-spin (or point cloud) registration (e.g., iterative closest point (ICP), point-to-surface matching). In some embodiments, to improve the accuracy of the registration process (and therefore the accuracy of the resulting estimated surface), the LiDAR points may be segmented into points that belong to a static reference surface (e.g., the ground, vegetation, buildings) based on their height above the estimated ground surface (e.g., filtering out points that are within a height band such as 10 centimeters to 3 meters above the estimated ground surface), and the resulting segmented points clouds with the segmented LiDAR points may be registered. This segmentation essentially removes a large source of potential outliers that do not have a direct correspondence between successive LiDAR frames because they are likely to be moving. As such, registering these segmented point clouds should improve both the accuracy and speed of the point cloud registration process (and the accuracy of the estimated road surface profile). In some embodiments, the multi-spin registration process may primarily seek to address inaccuracies in the pitch angle estimate, as this is often the ego-pose parameter with the highest dynamic. As such, in some embodiments, the registration process may be reduced to an estimation or refinement of the difference in pitch angles between a (e.g., segmented) point cloud and a (e.g., known, estimated) reference surface (e.g., the ground).

The registration of multiple (e.g., segmented) LiDAR spins provides a variety of benefits. For example, it effectively implements a fine-adjustment of the relative transformation between LiDAR frames, compensating for potentially inaccurate ego-motion estimates (e.g., due to high dynamic events such as hitting a speedbump or pothole, harsh braking, acceleration, etc.). The registration of multiple LiDAR frames into a common coordinate frame (typically the ego-motion pose of a previous frame) also increases sampling density on the ground surface. As such, refining ego-motion estimates by registering segmented LiDAR spins increases the accuracy and density of the LiDAR data, which should improve the accuracy of downstream tasks.

Depending on the downstream application, a desired accuracy of an estimated road surface profile may not be achievable using raw LiDAR measurements (even motion-compensated LiDAR measurements) because measurements produced using LiDAR sensors include systematic measurement biases that impact the measured range and height values. One type of LiDAR measurement bias is a range-dependent height offset caused by the divergence or expansion of the LiDAR beam, manifesting as a positive bias on the detected height or z-coordinate (points appear higher than the true value) and a negative bias on the range or x-coordinate (points appear closer to the ego-vehicle). The other prominent LiDAR measurement bias is a reflectivity-dependent offset. This bias is caused by the stronger echo from bright/retro-reflective objects compared to darker objects, and has a similar effect as the range-dependent height offset (e.g., estimated ranges are shorter than their true values, estimated heights are higher than their true values), but with a different magnitude. Assuming an approximately flat road surface, this reflectivity-dependent bias manifests predominantly as a height offset. Either or both biases may be addressed by estimating the respective bias magnitudes and compensating measured LiDAR points by removing the bias, thereby increasing the measurement accuracy.

In an example bias estimation process, one or more data collection vehicles may be used to generate and accumulate various LiDAR measurements. To estimate a range-dependent height bias, observed height values representing a fixed location (e.g., a patch on the ground) in an accumulated LiDAR point cloud may be binned by measurement range. Due to the nature of the range-dependent height bias, points that are observed from closer ranges and steeper incidence angles should be less impacted by the range-dependent height bias than points observed from a farther range and shallower incidence angles. As a result, observed height values measured from a closer range should be more accurate than those measured from a farther range. As such, the observed height values in each binned range band (e.g., in one-meter buckets) may be combined or aggregated (e.g., by taking the median height). In some embodiments, the height bias or offset for each range bin may be calculated based on the difference between the combined height value for that bin and some designated ground truth height. For example, the combined height value corresponding to the closest measurement range band (e.g., within a designated measurement range such as one meter) may be taken as ground truth, or a ground truth height may be calculated as a weighted median so closer measurements are given higher weight.

To estimate a reflectivity-dependent height bias, one or more locations (e.g., patches on the ground) represented in an accumulated LiDAR point cloud with sufficient variation in reflectivity may be identified (e.g., local neighborhoods with high reflectivity paired with low reflectivity of the ground surface tarmac, such as local neighborhood of road marks), and observed height values that were measured from approximately the same range may be binned based on measured reflectivity. As such, the observed height values in each binned reflectivity band may be combined (e.g., taking the median height), and the height bias or offset for each reflectivity bin may be calculated based on the difference between the combined height value for that bin and some designated ground truth height. Ground truth height may be taken from (e.g., the median height of) points from the accumulated LiDAR point cloud that were measured within a designated measurement range, or may be calculated by compensating observed height values using corresponding range-dependent height biases. In some embodiments, instead of calculating range-dependent and reflectivity-dependent height biases in separate processes, both may be estimated by sampling an accumulated LiDAR point cloud, binning observed height values into range and reflectivity buckets, and using a joint two-dimensional (2D) nonlinear optimization to compute both biases using observed height values that were measured within a designated measurement range as ground truth heights.

As such, range-dependent height biases may be computed (e.g., offline) for various range buckets with any designated size, reflectivity-dependent height biases may be computed (e.g., offline) for various reflectivity buckets with any designated size, and the estimated biases may be stored in any suitable way (e.g., in one or more look up tables, indexed by range and/or reflectivity). Accordingly, LiDAR points measured during an online process may be compensated by looking up and subtracting a range-dependent height bias corresponding to the measured range, and/or by looking up and subtracting a reflectivity-dependent height bias corresponding to the measured reflectivity. Correcting measured LiDAR points for measurement bias improves their accuracy, as well as the accuracy of a resulting estimated (e.g., ground or road) surface.

Returning to an example online process, with the input LiDAR points corrected for measurement bias, segmented (e.g., into ground points only), and co-registered, the predicted trajectories may be estimated by extrapolating the state of a vehicle steering model (e.g., the Ackerman steering model), any number of 3D points may be sampled along each wheel trajectory (e.g., using some placeholder height such as z=0), and a surface profile along each of the wheel trajectories may be estimated by sampling those LiDAR points that are within a designated (e.g., direction-dependent) 3D radius from the 3D position of the wheel track points. With sufficient sampling density, there should be a variable number of sampled LiDAR points for each wheel track point, and an optimized height value may be fitted to the sampled LiDAR points for each wheel track point using a nonlinear optimization such as a classical second order least squares solver (e.g., Levenberg-Marquardt) or (e.g., for real-time systems) a first order gradient descent method (e.g., with a designated number of iterations). The impact of outlier observations (e.g., points that have a height value that is significantly different from the current estimate) may be mitigated using a robust cost function (e.g., Cauchy, Huber etc.). The optimization may be reduced to a ID optimization in some embodiments in which a predicted trajectory and associated LiDAR points may be unrolled and represented in the height-range (z/d) space (e.g., where z represents the height of a profile point estimate and d represents the range from the ego-vehicle on the unrolled trajectory). In some embodiments, one or more parameters of the cost function may be set based on ground truth noise level estimates (e.g., standard deviation of the z-residuals in a given ground patch may be averaged over any number of ground patches and used to tune a in the Cauchy loss function or δ in the Huber loss function).

As such, the optimization step may generate an optimized height (z) value for each wheel track point, and the resulting (e.g., ground, road) surface profile may be provided to an autonomous vehicle drive stack to enable safe and comfortable planning and control of the autonomous vehicle. For example, an autonomous vehicle may navigate the vehicle to avoid detected hazards on the road or detected protuberances (e.g., dips, holes) in the road, adapt the vehicle's suspension system to match a detected road profile (e.g., by compensating for bumps in the road), and/or apply an early acceleration or deceleration based on an approaching surface slope in a detected road profile. Any of these functions should serve to enhance safety, improve the longevity of the vehicle, improve energy-efficiency, and/or provide a smooth driving experience.

In some embodiments, one or more stereo cameras of an ego-machine may be used to generate pairs of stereo images while the ego-machine navigates through an environment, each stereo image pair may be used to generate a stereo disparity field comprising stereoscopic disparity values (also known as stereo parallax), and a surface disparity field representing a surface in the environment (e.g., the ground) may be generated by iteratively refining estimated disparity values using a constrained nonlinear optimization process that is tailored with one or more weights to directly solve for the disparity field of the surface such as the ground (the ground disparity field). The resulting surface (e.g., ground) disparity field may be used for a variety of downstream tasks, such as obstacle detection, segmentation of a navigable space, ego-motion refinement, and/or generation of an estimated surface profile.

More specifically, in some embodiments, a surface structure such as a height profile of the ground or road surface may be estimated from stereo image pairs using a non-parametric model. Standard stereo matching techniques typically attempt to generate a high-fidelity reconstruction of all portions of the observed scene. Conventionally, the estimation of specific geometric entities such as the ground surface is performed by lifting a stereo disparity field to 3D using triangulation. In contrast, some embodiments perform this estimation directly in the disparity field space. Unlike off-the-shelf stereo methods, the prior knowledge of the geometric properties of the (e.g., ground) surface may be directly embedded in a cost function that derives weights for the optimization algorithm. Some embodiments enhance the robustness of the estimation process by enforcing a local smoothness of the estimated surface field (e.g., assuming no large height discontinuities on the ground, road, or other navigable surface). The detection of obstacles on the road surface is significantly simplified in embodiments in which a stereo disparity field and a ground disparity field are simultaneously availability.

In an example estimation of a ground disparity field, a stereo disparity field (which may also be referred to as a disparity image) may be progressively downsampled to form a pyramid of stereo disparity layers. Ground disparity estimation may begin at the coarsest pyramid layer, and ground disparities may be initialized with stereo disparities from the coarsest pyramid layer. An iterative process may be used to generate and iteratively refine estimated ground disparity values using a constrained hierarchical optimization that minimizes a cost function that defines one or more weights. For example, the optimization process may be constrained using a measurement deviation weight that penalizes measured disparity values (derived from stereo images) that deviate from estimated disparity values (encouraging the optimization to converge to smaller disparities on the ground level), a weight that emphasizes disparity values based on proximity to a predicted ego-trajectory (encouraging the optimization to focus on regions that are likely to be part of the ground, road, or other navigable surface), a weight that deemphasizes disparity values below a detected horizon line based on proximity to the detected horizon (since disparity values should be zero at the horizon, and disparity values above the horizon should have no contribution, in various embodiments), and/or otherwise. As such, the refined disparities may be upsampled and passed to the next, higher-resolution pyramid layer. This process may be repeated until reaching and refining the highest-resolution layer, ultimately producing a disparity field representing the ground surface (a ground disparity field).

A number of variations are possible. For example, in some embodiments, each of the stereo images may be iteratively downsampled to derive an image pyramid for each stereo image, stereo matching may be performed in the coarsest layer, and ground disparity estimation may be performed by iteratively refining estimated ground disparity values using a weight that emphasizes disparity values that correspond to higher intensity gradient consistency in the stereo images (encouraging the optimization to focus on regions that are likely to be part of the road). This may involve a lookup into the rectified image data, but should increase the accuracy and robustness of the estimation since the source data are incorporated into the optimization process. As such, the refined ground disparity values may be upsampled and passed to the next, higher-resolution pyramid layer, and the process may be repeated (looking up intensity gradients from a corresponding layer of the image pyramids for the stereo images to generate corresponding weights for each layer of refinement) until reaching and refining the highest-resolution layer.

In another example, each of the stereo images may be iteratively downscaled to derive an image pyramid for each stereo image, stereo matching may be performed in the coarsest layer, and ground disparity estimation may be performed using measurement deviation weights derived based on the difference between the estimated ground disparity values and the disparity values in the coarse disparity image. The coarse disparity image may be refined using optical flow (which compensates for calibration inaccuracies), the coarse disparity image and coarse ground disparity field may be upsampled and passed to the next, higher-resolution pyramid layer, and the process may be repeated (refining using measurement deviation weights derived based on the difference between the upsampled ground disparity field and the upsampled, refined disparity image) until reaching and refining the highest-resolution layer. These are just a few examples, and other variations may be implemented within the scope of the present disclosure.

As such, the resulting ground disparity field may be used to perform a variety of tasks. Taking obstacle detection an example, the difference between the stereo disparity field and the ground disparity field may be used to detect objects. For example, the disparity values may be lifted to 3D (e.g., converted to range values, the range values may be backprojected into 3D space) to derive corresponding height values, and a range-dependent threshold height may be applied to the difference between stereo and ground disparity values to detect obstacles based on their height above the estimated ground surface. In some embodiments, a corresponding threshold may be applied directly in the disparity space by imposing a range-dependent threshold disparity difference. (The range dependence may be used to compensate for decreases in disparity and detected height with increasing scene depth.) As such, if the disparity is larger in the ground disparity image than the stereo disparity image by more than a threshold amount, there is likely an object in a corresponding region, so obstacles on the ground surface may be detected based on taking the difference between ground and stereo disparities and applying a designated threshold to the difference. In some embodiments, pixels that satisfy a detection threshold may be grouped into clusters, and clusters with a threshold size and/or designated shape may be taken as detected objects. In some embodiments, detected objects may be tracked and/or evaluated to confirm they appear in a threshold number of frames prior to confirming a detection. As such, (confirmed) object detections may be passed to one or more downstream components to trigger one or more corresponding responses (e.g., path planning, emergency braking, etc.).

Taking segmentation of a navigable space as an example, the regions of the ground disparity field (or regions of a difference image generated by subtracting stereo disparity from ground disparity) where stereo and ground disparities are within a designated threshold may be classified as ground, a representation of a navigable space may be generated by radially casting 2D rays in the ground disparity field (or the difference image) from a reference point (e.g., the position of the vehicle, the closest ground location) in different directions to the first location where a disparity difference above the designated threshold occurs. In this example, each ray continues until it hits an obstacle (indicated by a threshold disparity difference) or a road boundary. The area where rays travel without hitting any obstacles or boundaries may be classified as a navigable or drivable space. The points where rays intersect with obstacles or boundaries may be used to generate a 2D contour delineating the boundary of the navigable space. As such, a representation of the navigable space (e.g., a backprojection of the 2D contour into 3D space) may be provided to one or more downstream components to trigger one or more corresponding responses (e.g., path planning, emergency braking, etc.).

Taking ego-motion refinement an example, the ground disparity field may be used to compensate ego-motion for high dynamic attitude changes. Real-time ego-motion is typically constrained to the use of high frequency signals such as inertial measurements and wheel odometry (primarily resulting from real-time constraints and desired update frequencies), although the spin-to-spin registration of point clouds can fail or result in limited accuracy in situations involving high dynamic motion. As such, ego-motion estimates (transforms) may be refined using observations of the ground surface (e.g., ground disparity field) over consecutive frames. More specifically, ground disparity fields estimated for successive frames may be lifted (e.g., converted into range values and backprojected into 3D space), the resulting 3D point clouds may be registered (e.g., using an iterative closest point registration) to estimate a relative transform between the 3D point clouds, and the relative transform may be used to refine an initial ego-motion transform generated by ego-motion compensation.

Taking surface profile estimation an example, the ground disparity field may be lifted to 3D (e.g., by converting to range values and backpropagating into 3D space), and the resulting lifted point cloud may be interpreted as a surface model. In some embodiments, the lifted point cloud may be sampled along one or more predicted trajectories, and the height of each trajectory point may be fitted to the heights of the corresponding sampled points using a nonlinear optimization to generate a surface profile.

Accordingly, the techniques described herein may be used to estimate the 3D structure of a surface such as the ground or road surface, detect obstacles in the environment, and/or detect a navigable space, and a representation of the detection(s) may be provided to an autonomous vehicle drive stack to enable safe and comfortable planning and control of the autonomous vehicle. For example, an autonomous vehicle may navigate the vehicle to avoid detected obstacles or detected protuberances (e.g., dips, holes) in the road, adapt the vehicle's suspension system to match a detected road profile (e.g., by compensating for bumps in the road), and/or apply an early acceleration or deceleration based on an approaching surface slope in a detected road profile. Any of these functions should serve to enhance safety, improve the longevity of the vehicle, improve energy-efficiency, and/or provide a smooth driving experience.

With reference to FIG. 1, FIG. 1 is an example surface estimation pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 1500 of FIGS. 15A-15D, example computing device 1600 of FIG. 16, and/or example data center 1700 of FIG. 17.

In some examples, the machine learning model(s) (e.g., deep neural networks, language models, LLMs, VLMs, multi-modal language models, perception models, tracking models, fusion models, transformer models, diffusion models, encoder-only models, decoder-only models, encoder-decoder models, neural rendering field (NERF) models, etc.) described herein may be packaged as a microservice—such an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model(s) (e.g., weights and biases). In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model(s) may be accessible via one or more APIs—such as REST APIs. As such, and in some embodiments, the machine learning model(s) described herein may be deployed as an inference microservice to accelerate deployment of a model(s) on any cloud, data center, or edge computing system, while ensuring the data is secure. For example, the inference microservice may include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high performance inference), an inference runtime software to execute the machine learning model(s) and provide outputs/responses to inputs (e.g., user queries, prompts, etc.), and enterprise management software to provide health checks, identity, and/or other monitoring. In some embodiments, the inference microservice may include software to perform in-place replacement and/or updating to the machine learning model(s). When replacing or updating, the software that performs the replacement/updating may maintain user configurations of the inference runtime software and enterprise management software.

In some embodiments, the systems and methods described herein may be performed within a simulation environment (e.g., NVIDIA's DriveSIM, NVIDIA's ISAAC GYM, NVIDIA's ISAAC SIM, etc.) using simulated data (e.g., simulated sensor data of simulated sensors of a virtual or simulated machine). For example, simulated sensor data may be used (e.g., processed using one or more machine learning models, neural networks, etc.) to perform the operations described herein, and may use this information to perform operations (e.g., control, navigation, planning, etc. operations) associated with the virtual machine within the environment. These simulated operations may be used to test performance of the underlying algorithms, systems, and/or processes prior to deploying them in the real-world. In some instances, the simulation may be used to generate synthetic training data—e.g., training data including regions of interest and/or sub-regions of interest from within the simulation. In some embodiments, other methods may be used in addition or alternatively from a simulation to generate synthetic training data. For example, the synthetic training data may be generated using neural rendering fields (NERFs), Gaussian splat techniques, diffusion models, electrostatic models (e.g., Poisson flow generative models (PFGMs), etc. The synthetic training data (in addition to or alternatively from real-world data) may then be processed to determine geometry, curvature, semantic information, classification information, and/or other information related to features of interest, such as lines, longitudinal features (e.g., poles), and/or other features within a driving environment, a warehouse, etc., for example. In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system that uses universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

In some embodiments, teleoperation or remote control of a vehicle or other machine may be performed using a remote control or teleoperation system. For example, the systems and methods described herein may be used to identify road surface information that may be included in a visualization or mapping of an environment to aid a remote operator in controlling—or providing waypoints or other indications of control or navigation—an autonomous or semi-autonomous machine through an environment.

In some embodiments, the system and methods described herein may be deployed in a robotics application. For example, a robot or robotic system may include one or more onboard processors (e.g., CPUs, GPUs, hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). The robotic system may use these processors to execute one or more machine learning models (e.g., language models) that allow it to perform complex tasks autonomously or semi-autonomously, such as interacting with and/or manipulating static and/or dynamic objects, or navigating environments using sensors such as cameras, LiDAR, RADAR, ultrasonic sensors, and more. The system may use sensor fusion techniques to combine data from multiple sensors (e.g., cameras, infrared, LiDAR, RADAR, accelerometers) to create a comprehensive model of the robot's surroundings. This data may be processed locally on the robot or sent to remote servers for more computationally intensive tasks, such as 3D mapping or SLAM (Simultaneous Localization and Mapping). In one or more embodiments, data from individual robots (e.g., sensor data, task status, or environmental conditions) may be uploaded to the cloud, where centralized AI models can analyze and distribute optimized commands to an entire fleet. In some embodiments, the machine learning model(s) (e.g., language models, VLMs, LLMs, MMLMs, diffusion models, NeRF models, DNNs, etc.) described herein may be used to allow the robot to perceive and reason about the environment and/or communicate with one or more other robots and/or persons in an environment. In some embodiments, the robot may communicate (e.g., using one or more network interface cards (NICs) and/or data processing units (DPUs)) with one or more locally hosted servers/computing devices and/or with one or more remotely located servers/computing devices (e.g., in one or more data centers).

Although examples may be described herein with respect to using machine learning models, such as neural networks, this is not intended to be limiting. For example, and without limitation, any of the various machine learning models and/or neural networks described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoder neural networks, artificial neural networks (ANNs), convolutional neural networks (CNNs), recurrent neural networks (RNNs), perceptrons, Long/Short Term Memory (LSTM) networks, multi-layer perceptron (MLP) networks, deep stacking networks (DSNs), generative pre-training (GPT) models or networks, feed forward networks, radial basis function ANNs, self-organizing maps (SOMs), Kohonen maps, Hopfield networks, Boltzmann machine, deep belief neural networks, deconvolutional neural networks, generative adversarial networks (GANs), liquid state machines, modular neural networks, liquid state machines, sequence-to-sequence models, networks using transformer architectures, diffusion models (e.g., diffusion probabilistic models, score-based generative models, etc.), neural rendering field (NeRF) models, Kolmogorov-Arnold networks (KANs), models with encoder-only architectures, models with decoder-only architectures, models with encoder-decoder architectures, generative machine learning models, language models, large language models (LLMs), vision language models (VLMs), multi-modal language models (MMLMs), etc.), and/or other types of machine learning models.

In the embodiment illustrated in FIG. 1, the surface estimation pipeline 100 uses LiDAR data 101 and ego-motion data 102 (e.g., generated using corresponding sensors of an ego-machine such as the autonomous vehicle 1500 of FIGS. 15A-15D) to detect a 3D surface structure of an estimated surface 180. In an example overview, a motion compensation component 105 may use the ego-motion data 102 to apply motion compensation to the LiDAR data 101, and a surface estimation component 140 may accumulate the resulting motion-compensated LiDAR data 110 in a sampling queue 175, sample the accumulated LiDAR data from the sampling queue 175 (e.g., along one or more predicted trajectories generated by the path generator 130), and fit a height value for each trajectory point to the heights of corresponding sampled points using a nonlinear optimization. In some embodiments, the surface estimation component 140 may improve the accuracy of the fitted height values by applying bias correction to measured height values (e.g., of the LiDAR data 101, the motion-compensated LiDAR data 110, etc.) and/or applying ego-motion refinement to register successive (e.g., segmented) points clouds and refine the accumulated LiDAR data in the sampling queue 175. As such, the resulting estimated surface 180 (e.g., a road surface profile modeled along the wheel track(s) of the ego-machine) may be provided to a control component(s) 190 of the ego-machine, such as an adaptive suspension control system that uses the estimated surface 180 to modulate the damping characteristic of the ego-machine's suspension system to counteract indentations (e.g., potholes) or protrusions (e.g., speed bumps) represented in the estimated surface 180.

Figure 15A:
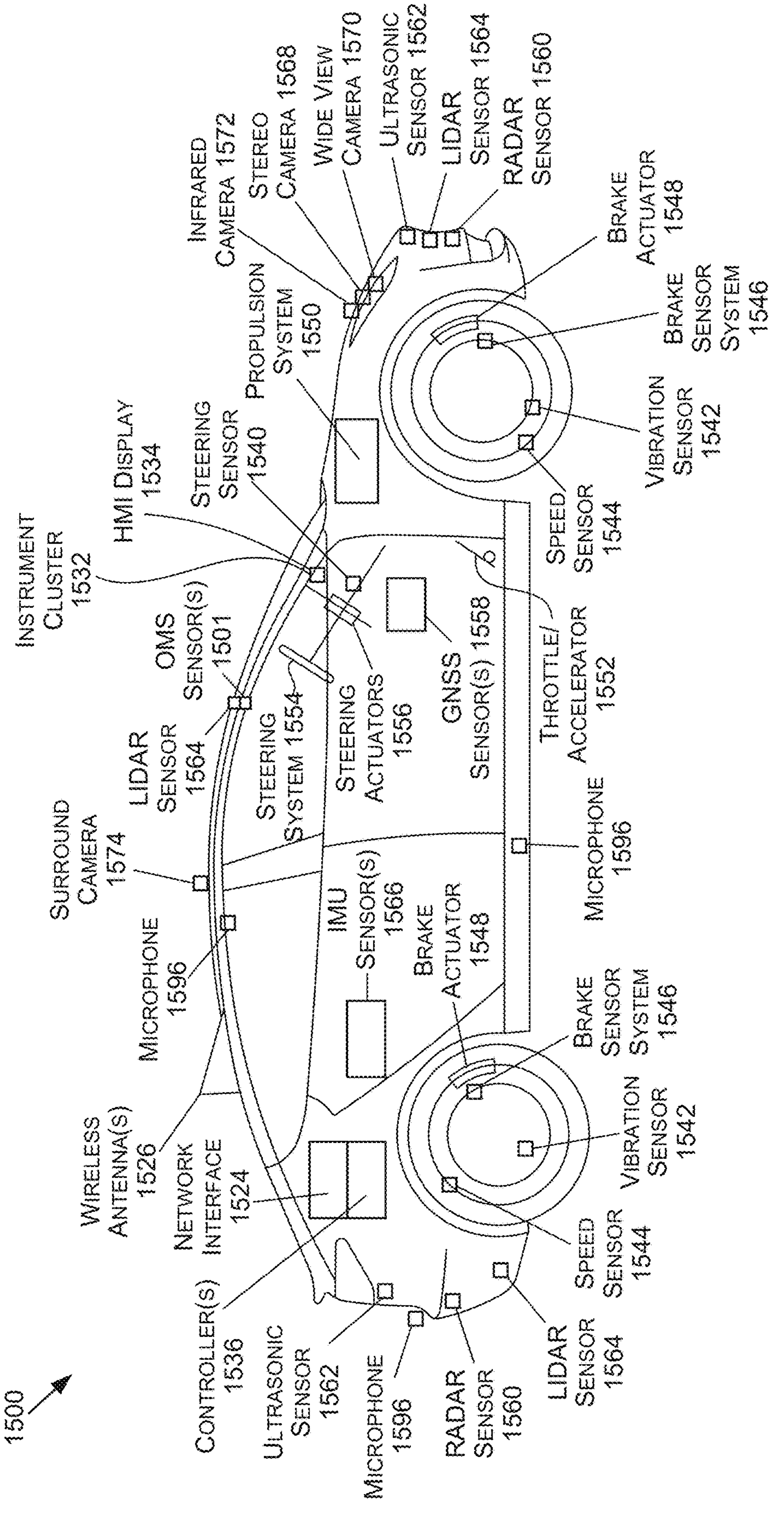
FIG. 15A is an illustration of an example autonomous vehicle, in accordance with some embodiments of the present disclosure.

More specifically, in some embodiments, an ego-machine (e.g., the autonomous vehicle 1500 of FIGS. 15A-15D) may be equipped with one or more LiDAR sensors (e.g., LiDAR sensor(s) 1564 of FIG. 15A), and the LiDAR sensors may be used to generate LiDAR data 101 (e.g., while the ego-machine navigates through an environment). Ego-motion data 102 representing the ego-motion of the ego-machine may be recorded using any known technique (e.g., using an inertial measurement unit (IMU), global positioning system (GPS), etc.). Sensor data from any given sensor may be generated at any frame rate, synchronized or otherwise associated with sensor data from other sensors, and processed by the surface estimation pipeline 100 at any frame rate. The implementation illustrated in FIG. 1 is meant simply as an example, and other embodiments may additionally or alternatively rely on other types of sensor data, such as RADAR data, sonar data, depth data, and/or other types.

The motion compensation component 105 may apply motion compensation to the LiDAR data 101 from any number of LiDAR sensors and/or scans (or spins) using the ego-motion data 102 of the ego-machine to transform raw LiDAR range measurements into a common spatial representation (e.g., a frame of aggregated LiDAR data representing a scene in the environment). For example, a LiDAR sensor may generate a representation of the surrounding environment at some rate (e.g., ten times per second, resulting ten spins per second). However, the LiDAR sensor typically would not generate an entire spin instantaneously at a single timestamp. Instead, it typically rotates substantially continuously, taking some duration of time (e.g., 100 milliseconds) to complete one spin. Consequently, each LiDAR point within a spin may be recorded at a unique timestamp, reflecting the sensor's ongoing rotation. As such, the motion compensation component 105 may address this temporal offset by using the ego-motion data 102 (e.g., typically provided at 100 Hz from vehicle-based sensors) to adjust the spatial positions of the LiDAR points. This process may correct for the movement of the ego-machine during each (e.g., 100-millisecond) capture period, aligning the points within a spin to a single reference timestamp. For example, if the ego-machine moves between the generation of the first and last points in a spin, the ego-motion compensation component 105 may calculate and apply the necessary transformations to account for this motion, effectively removing the ego-motion of the ego-machine from the LiDAR data 101. As a result, ego-motion compensation may generate some number of LiDAR spins (e.g., ten) per second, where each spin may be corrected to reflect a consistent spatial configuration at a common timestamp. As such, the motion compensation component 105 and/or the surface estimation component 140 may store and/or periodically update this motion-compensated LiDAR data 110 in the sampling queue 175 (e.g., such that the sampling queue 175 effectively stores an accumulated point cloud accumulated over a sliding window of some number of frames, updated at any suitable framerate, etc.).

At a high level, the surface estimation component 140 may generate the estimated surface 180 by sampling the (e.g., motion-compensated, accumulated) LiDAR data (e.g., in one or more localized regions) along one or more predicted trajectories and fitting a height value to the set of sampled heights for each sampled trajectory point using a nonlinear optimization. In the example illustrated in FIG. 1, the surface estimation component 140 includes a bias correction component 145 that applies bias correction to measured height values (e.g., of the LiDAR data in the sampling queue 175), an ego-motion refinement component 150 that registers successive (e.g., segmented) points clouds and refines the accumulated LiDAR data in the sampling queue 175, a sampling component 165 that samples the (e.g., accumulated, bias-corrected, registered) LiDAR data from the sampling queue 175 along one or more predicted trajectories (e.g., generated by the path generator 130), and a fitting component 170 that fits a height value for each trajectory point to the heights of corresponding sampled points using a nonlinear optimization.

In some embodiments, the bias correction component 145 applies bias correction by removing measurement biases or offsets from measured height values (e.g., of the LiDAR data in the sampling queue 175, or at any other point in the surface estimation pipeline 100). For example, range-dependent height biases may be pre-computed for various range buckets with any designated size, reflectivity-dependent height biases may be pre-computed for various reflectivity buckets with any designated size, and the estimated biases may be stored as LiDAR bias data 160 in any suitable form (e.g., in one or more look up tables, indexed by range and/or reflectivity). As such, the bias correction component 145 may compensate height values of (e.g., measured, motion-compensated, registered) LiDAR points by looking up and subtracting a range-dependent height bias corresponding to the measured range, and/or by looking up and subtracting a reflectivity-dependent height bias corresponding to the measured reflectivity.

Figure 2:
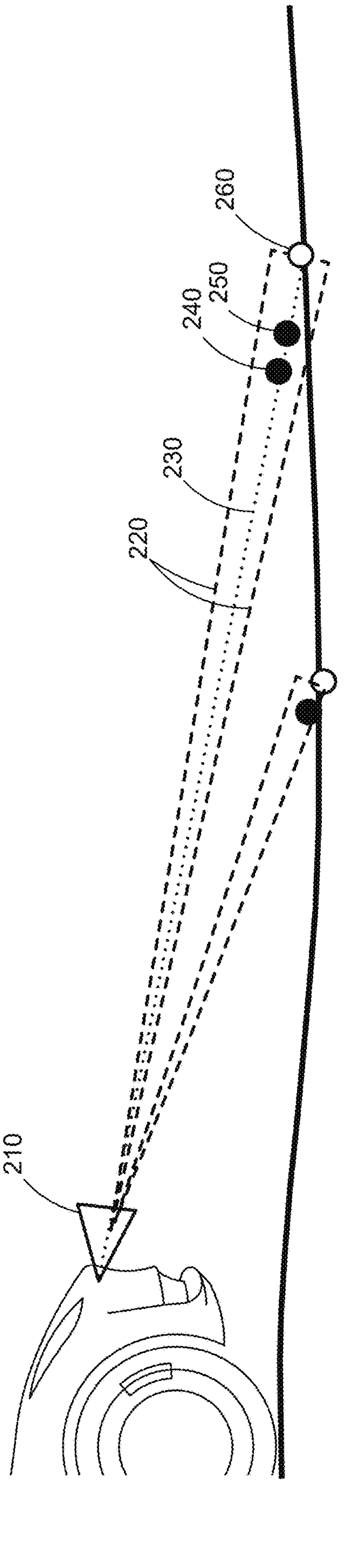
FIG. 2 illustrates a range-dependent height bias in LiDAR sensor data, in accordance with some embodiments of the present disclosure.

FIG. 2 illustrates a range-dependent height bias in LiDAR sensor data. Due to the divergence of a beam emitted by a LiDAR sensor 210, part of the beam's divergence cone (illustrated in dashed outlines 220) will typically hit a navigable surface earlier than the ideal beam (shown as dotted line 230). Depending on the strength of the returned signal, conventional LiDAR sensors report the measured 3D position to be closer and higher (illustrated by dots 240, 250) than the true position (illustrated by dot 260). The magnitude of this effect increases with range.

Figure 3:
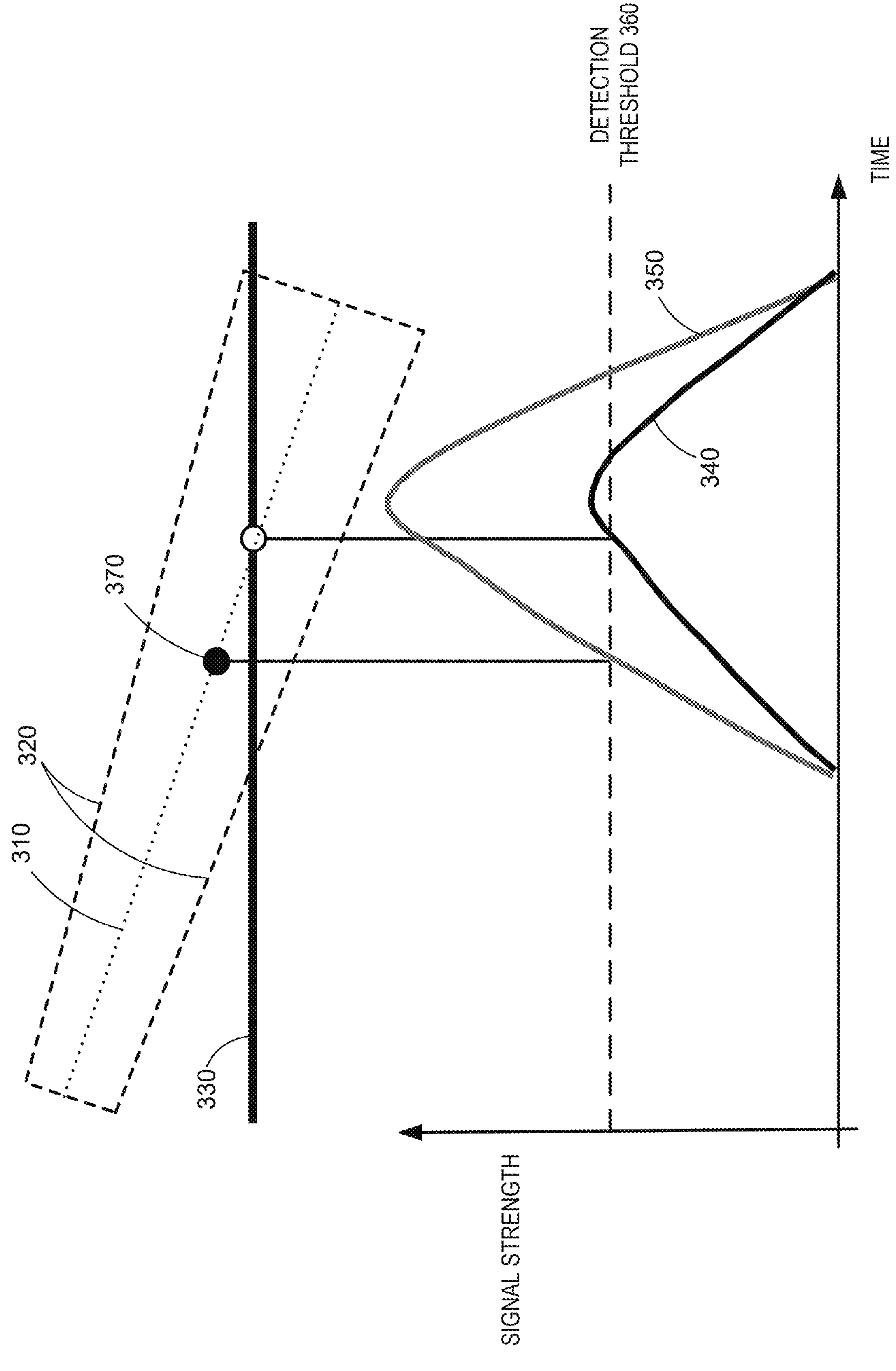
FIG. 3 illustrates a reflectivity-dependent height bias in LiDAR sensor data, in accordance with some embodiments of the present disclosure.

FIG. 3 illustrates a reflectivity-dependent height bias in LiDAR sensor data. More specifically, this figure illustrates a scenario in which a LiDAR beam (illustrated by a divergence cone 320 corresponding to an ideal beam 310) emitted by a LiDAR sensor (not illustrated) hits a navigable surface 330 at an oblique angle. For a low reflectivity surface (e.g., surfaces made with dark tarmac or concrete), the return signal 340 will typically reach the LiDAR sensor's detection threshold 360 later in time than a return signal 350 produced by a highly reflective surface (e.g., surfaces with road markings, metal manhole covers). This results in a bias where measured height coordinates for reflective surfaces (e.g., point 370) are reported above the true surface height.

To correct for one or more of these measurement biases, in some embodiments, one or more data collection vehicles may be equipped with one or more LiDAR sensors (e.g., a single, roof-mounted, 360° field-of-view LiDAR scanner; a forward-facing, grille-mounted or above-windshield-mounted, long-range LiDAR sensor, etc.), and the LiDAR sensor(s) of the data collection vehicle(s) may be used to generate and accumulate various LiDAR measurements. Depending on the desired use case, the environment and/or scenario may be selected or designated to cover a range of conditions, terrains, weather situations, times of day, traffic densities, and/or road types to ensure comprehensive data collection. In some embodiments, a bias estimation component executed by any suitable computing device (e.g., by the computing device 1600 of FIG. 16A, by a computing device in the data center 1700 of FIG. 17, etc.) uses any known ego-motion compensation and/or point cloud registration technique to ego-motion compensate point clouds and/or register point clouds from multiple LiDAR spins or scans to one another to increase point density and generate an accumulated LiDAR point cloud.

Figure 4:
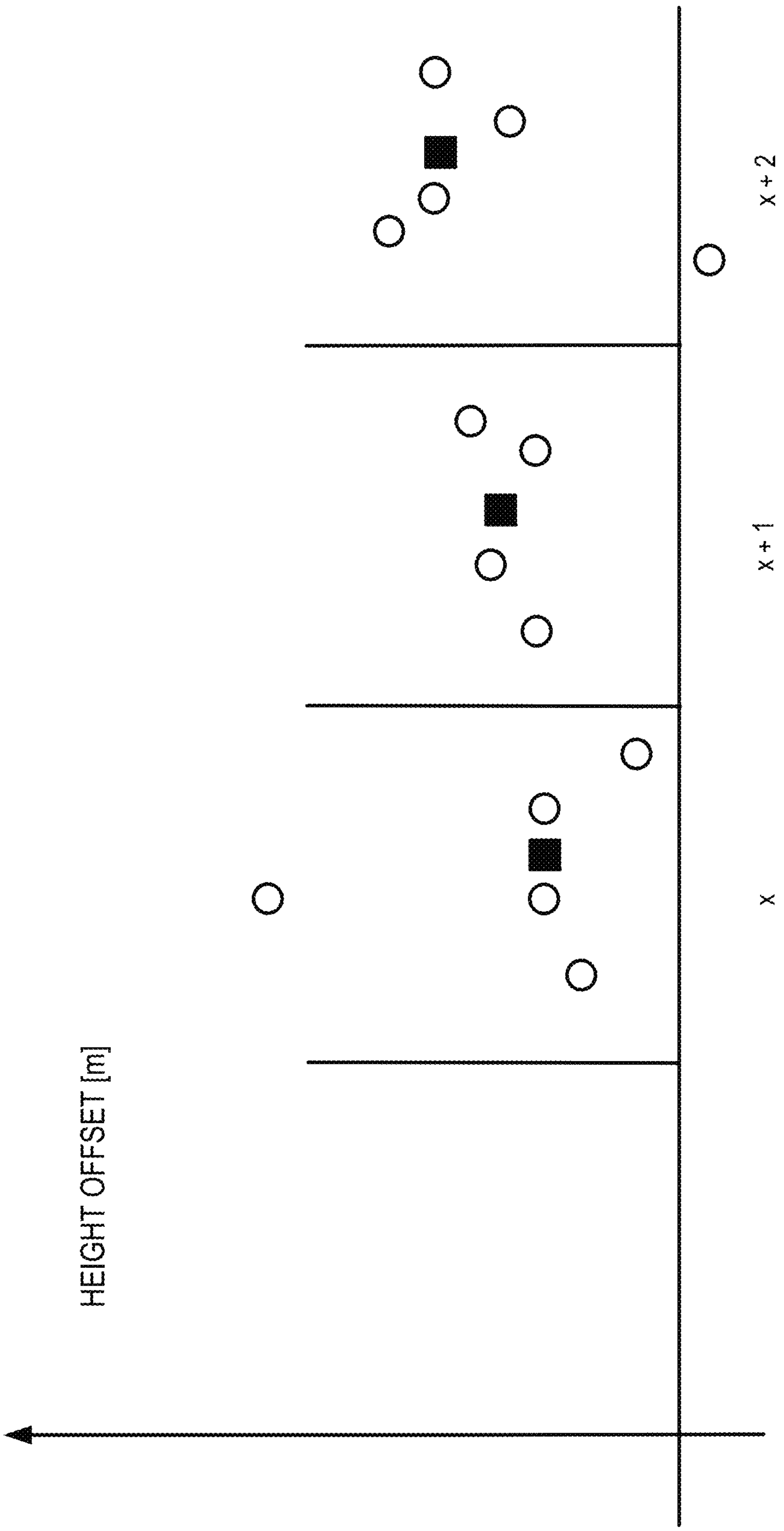
FIG. 4 illustrates an example process for estimating a height bias in LiDAR sensor data, in accordance with some embodiments of the present disclosure.

To estimate a range-dependent height bias, the bias estimation component may identify a fixed location (e.g., a patch on the ground) represented in the accumulated LiDAR point cloud, bin observed height values in the fixed location by measurement range, combine or aggregate the height values in each bin (or bucket), and calculate a range-dependent height bias by subtracting a ground truth height from the combined height value for a given bin. FIG. 4 illustrates an example process for estimating a height bias in LiDAR sensor data, in accordance with some embodiments of the present disclosure. Taking a range-dependent height bias as an example, the bias estimation component may distribute height measurements (illustrated in FIG. 4 as white circles) representing a common local neighborhood in the accumulated point cloud into range bins (e.g., with any suitable bin size, such as one meter). In this example, the bins to the left of FIG. 4 represent closer measurement ranges (e.g., measurements taken closer to the common local neighborhood), and bins to the right of FIG. 4 represent farther measurement ranges (e.g., measurements taken farther away from the common local neighborhood).

As such, the bias estimation component may combine or aggregate the height values within each bin using any suitable metric (e.g., by computing the median value of all measurements in a bin, illustrated in FIG. 4 as black squares). Combining measurements using the median height should produce a robust height estimate in the presence of outliers (e.g., such as those illustrated in bins x and x+2 in FIG. 4). Note that the actual number of measurements may be significantly higher than illustrated in FIG. 4 (e.g., on the order of thousands of measurements).

Accordingly, the bias estimation component may calculate the height bias for any given range bin by subtracting a ground truth height from the combined height value for a given bin. Due to the nature of the range-dependent height bias, points that are observed from closer ranges and steeper incidence angles should be less impacted by the range-dependent height bias than points observed from a farther range and shallower incidence angles, so observed height values measured from a closer range should be more accurate than those measured from a farther range. As such, the bias estimation component may use the combined height value corresponding to the closest measurement range band (e.g., within a designated measurement range such as one meter) as the ground truth height for that local neighborhood. In some embodiments, the bias estimation component may calculate a ground truth height by taking a weighted median of all (or some subset of) the height measurements, giving closer measurements a higher weight. These are just a few examples, and other variations may be implemented within the scope of the present disclosure.

As such, the bias estimation component may calculate a range-dependent height bias for any number of range buckets. In some embodiments, the bias estimation component may calculate multiple sets of range-dependent height biases based on different local neighborhoods in the accumulated point cloud, and may combine (e.g., average) the biases for common range buckets. As such, the bias estimation component may store the resulting correction values (e.g., in a 2D lookup table indexed by measurement range, as at least part of the LiDAR bias data 160 of FIG. 1, etc.) to facilitate efficient access during surface estimation.

Additionally or alternatively to estimating range-dependent height biases, the bias estimation component may estimate reflectivity-dependent height biases. For example, the bias estimation component may identify one or more locations (e.g., patches on the ground) in the accumulated LiDAR point cloud with at least a threshold amount of variation in reflectivity (e.g., local neighborhoods with high reflectivity paired with low reflectivity of the ground surface tarmac, such as local neighborhood of road marks). As such, the bias estimation component may bin observed height values that were measured from approximately the same range based on measured reflectivity, combine or aggregate the height values in each bin (or bucket), and calculate a reflectivity-dependent height bias by subtracting a ground truth height from the combined height value for a given bin. Using FIG. 4 to illustrate an example binning technique for a reflectivity-dependent height bias, the bias estimation component may distribute height measurements (illustrated in FIG. 4 as white circles) representing any number of identified local neighborhoods in the accumulated point cloud into reflectivity bins (e.g., with any suitable bin size, such as ten bins of size 0.1). For example, the height measurements illustrated in FIG. 4 may represent points measured from approximately the same measurement range, where the bins to the left of FIG. 4 represent lower measured reflectivity values, and the bins to the right of FIG. 4 represent larger reflectively values. As such, the bias estimation component may combine or aggregate the height values within each bin using any suitable metric (e.g., by computing the median value of all measurements in a bin, illustrated in FIG. 4 as black squares). As with the earlier example for range-dependent height bias estimation, the actual number of measurements used to estimate reflectivity-dependent height bias may be significantly higher than illustrated in FIG. 4.

Accordingly, the bias estimation component may calculate the height bias for any given reflectivity bin by subtracting a ground truth height from the combined height value for a given bin. In some embodiments, the bias estimation component may use a combined (e.g., median) height of the points in the local neighborhood from the accumulated LiDAR point cloud that were measured within a designated measurement range (e.g., corresponding to the closest measurement range bin used to estimate a range-dependent height offset) as ground truth height for that local neighborhood, or the bias estimation component may calculate a ground truth height by compensating observed height values using corresponding range-dependent height biases (e.g., subtracting a bias corresponding to the measurement range for a given measurement). In some embodiments, instead of calculating range-dependent and reflectivity-dependent height biases in separate processes, the bias estimation component may estimate both by sampling an accumulated LiDAR point cloud, binning observed height values into range and reflectivity buckets, and using a joint 2D nonlinear optimization to compute both biases using observed height values that were measured within a designated measurement range as ground truth heights. These are just a few examples, and other variations may be implemented within the scope of the present disclosure.

As such, the bias estimation component may calculate a reflectivity-dependent height bias for any number of reflectivity buckets. In some embodiments, the bias estimation component may calculate multiple sets of reflectivity-dependent height biases based on different local neighborhoods in the accumulated point cloud, and may combine (e.g., average) the biases for common reflectivity buckets. As such, the bias estimation component may store the resulting correction values (e.g., in a 2D lookup table indexed by reflectivity, as at least part of the LiDAR bias data 160 of FIG. 1, etc.) to facilitate efficient access during surface estimation.

Additionally or alternatively to estimating height biases, a noise estimation component executed by any suitable computing device (e.g., by the computing device 1600 of FIG. 16A, by a computing device in the data center 1700 of FIG. 17, etc.) may estimate a ground truth noise level and use the estimated ground truth noise level to set one or more parameters of a cost function used by the fitting component 170 of FIG. 1 (as explained in more detail below). For example, the noise estimation component may identify local neighborhoods (e.g., one meter diameter circular patches) in the accumulated point cloud, fit a 2nd order quadratic polynomial to the height measurements in each local neighborhood, and compute the ground truth noise level as the standard deviation of the residuals (e.g., averaged over any number of ground patches).

As such and returning to FIG. 1, the bias correction component 145 may compensate height values of (e.g., measured, motion-compensated, registered) LiDAR points by looking up and subtracting a range-dependent height bias corresponding to the measured range, and/or by looking up and subtracting a reflectivity-dependent height bias corresponding to the measured reflectivity. Although various embodiments described herein contemplate correction of LiDAR measurement bias for the purposes of surface estimation, bias-corrected LiDAR data may be used for any suitable task, such as those used in augmented reality, virtual reality, mixed reality, robotics, security and surveillance, autonomous or semi-autonomous machine applications, and/or any other technology spaces.

Continuing with the example illustrated in FIG. 1, in some embodiments, the ego-motion refinement component 150 registers successive (e.g., segmented) points clouds to generate refined ego-motion estimates, and uses the refined ego-motion estimates to refine the accumulated LiDAR data in the sampling queue 175. Generally, the ego-motion refinement component 150 may use any known registration process (e.g., ICP, point-to-surface matching, etc.) to improve the accuracy of transformations that map point clouds from successive LiDAR frames to a common coordinate system.

In some embodiments, the ego-motion refinement component 150 may use an estimated ground surface model 120 as a reference surface to improve the accuracy of the ego-motion refinement. For example, a ground surface estimation component 115 may use any known technique to estimate a representation of the ground surface model 120 based on LiDAR data (e.g., the LiDAR data 101, the motion compensated LiDAR data 110). Example ground surface estimation techniques include classifying and projecting points predicted to be on the ground surface onto a grid and smoothing projected values, for example, as described in U.S. patent application Ser. No. 17/992,569, Publication No. US20240028041A1) and/or based on image data (e.g., using 3D reconstruction to generate an estimated representation of the ground surface). The ground surface may be defined as a smooth and continuous surface that spans from the ego-machine's base or contact point outwards, and the ground surface estimation component 115 may focus on estimating a single ground surface model 120 and therefore avoid the ambiguities involved in finding multiple, disjoint surface models. The ground surface model 120 may be defined to cover the same distance range as the LiDAR data (e.g., up to 300 meters), and it may provide a robust estimate for areas that are occluded by certain non-ground objects in the input data (e.g., people, vehicles, and other objects on the road surface).

As such, the ego-motion refinement component 150 may include a reference surface segmentation component 155 that segments the LiDAR points in the sampling queue 175 into points that belong to a static reference surface (e.g., the ground, vegetation, buildings) based on their height above the estimated ground surface represented by the estimated ground surface model 120, and the ego-motion refinement component 150 may register the segmented point clouds. For example, the reference surface segmentation component 155 may filter out LiDAR points that are above a threshold height above ground (e.g., 10 centimeters) and/or below a threshold height above ground (e.g., 3 meters). In some embodiments that apply both a lower and upper threshold height above ground, the resulting filtered point cloud may effectively omit a height band (e.g., from 10 centimeters to 3 meters above the estimated ground surface) in which moving objects are expected, essentially removing a large source of potential outliers that do not have a direct correspondence between successive LiDAR frames because they are likely to be moving. As such, the ego-motion refinement component 150 may register the resulting segmented points clouds to improve the ego-motion estimates and refine the LiDAR data in the sampling queue 175.

In some embodiments, the ego-motion refinement component 150 may reduce the registration process to an estimation or refinement of the difference in pitch angles between a (e.g., segmented) point cloud and a (e.g., known, estimated) reference surface (e.g., the ground). In some embodiments, the ego-motion refinement component 150 may use estimated ground disparity fields to refine ego-motion estimates improve the accuracy of the LiDAR data in the sampling queue 175 (as explained in more detail below). These are meant simply as examples, and other variations may be implemented within the scope of the present disclosure.

In some embodiments, the sampling component 165 samples the (e.g., accumulated, bias-corrected, registered) LiDAR data from the sampling queue 175 along one or more predicted trajectories (e.g., generated by the path generator 130). Depending on the downstream use case, different surface features and different portions of the surface may be of interest. For example, some embodiments may seek to detect a representation of the height profile of the road or other surface along the tire tracks in front of a vehicle. Accordingly, the path generator 130 may sample any number of 2D or 3D points along a predicted 2D or 3D trajectory (e.g., sampling 2D points along one or more tire trajectories in a bird's eye view and assigning a candidate height such as zero to each point). This is meant simply as an example, and other techniques for sampling candidate points for a road or other surface are possible (e.g., sampling a designated number of points from a designated plane such as z=0 or some other designated region of the environment).

Continuing with the example in which one or more 2D or 3D points are sampled along one or more predicted trajectories, the path generator 130 may identify the trajectories based on the wheel angle 125. For example, the path generator 130 may use the Ackermann steering model and the wheel angle 125 to generate a representation of the 2D or 3D trajectory of one or more tires by simulating the vehicle's kinematic behavior based on its steering geometry. The Ackermann model defines a geometry that dictates how the wheels of a vehicle may be angled during a turn so the vehicle follows a smooth trajectory. Using this model, the inner and outer wheels of the vehicle should follow circular paths with different radii during a turn, centered on a common turning point. As such, the wheel angle 125 for the left and right tires may be detected using steering angle sensors and/or wheel position sensors, and the path generator 130 may use the wheel angle 125 for the left and right tires and the Ackermann model to calculate a representation of the predicted trajectory for each tire, such as the turning radius and curvature for each path in a 2D (e.g., top-down) view of the vehicle's movement plane (e.g., the x-y plane), assuming the road surface is flat. The path generator 130 may use the representation of each predicted trajectory to sample any number of 2D or 3D points (e.g., at regular intervals, logarithmically, etc.) along each trajectory (e.g., along the arc length extending from the front wheel to some designated distance). In some embodiments that sample 2D trajectory points, the path generator 130 may assign an initial height (e.g., zero) to each 2D point to generate a corresponding 3D sampling location.

Figure 5:
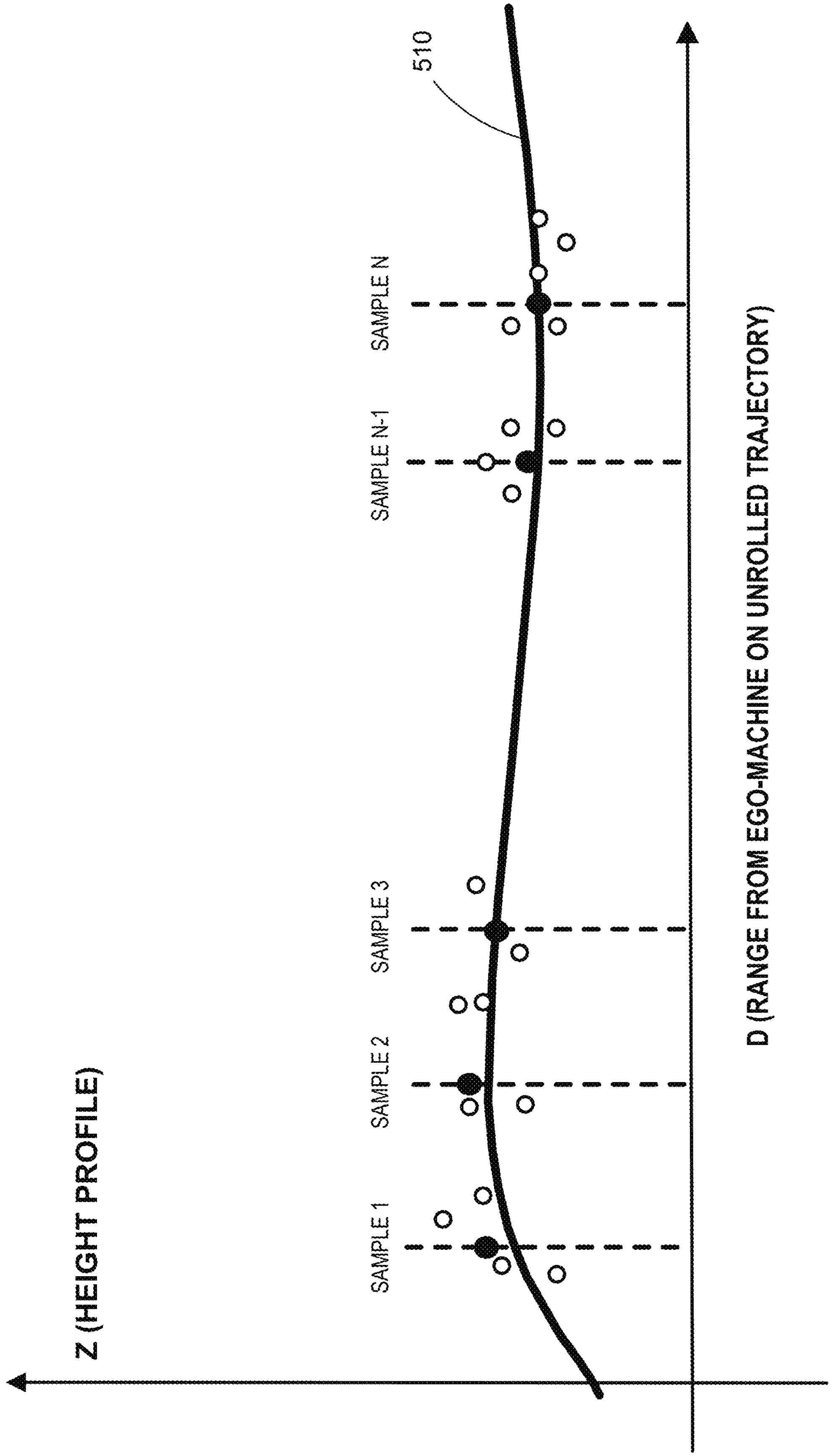
FIG. 5 illustrates an example technique for sampling LiDAR detections along a predicted trajectory, in accordance with some embodiments of the present disclosure.

As such, the sampling component 165 may sample LiDAR points from the sampling queue 175 that are within a designated (e.g., direction-dependent) 3D radius from the 3D position of each predicted 3D trajectory point (e.g., in each of one or more predicted wheel tracks). For example, the surface estimation component 140 may maintain a registered point cloud corresponding to some number of (e.g., most recently observed) spins in the sampling queue 171, the path generator 130 may periodically update the predicted trajectory or trajectories (e.g., at any suitable frame rate), and the sampling component 165 may project each predicted 3D trajectory point into the (e.g., most recently) registered point cloud represented in the sampling queue 171 to identify corresponding 3D sampling locations. As such, the sampling component 165 may sample points in the registered point cloud that are within a designated 3D radius of each 3D sampling location. FIG. 5 illustrates an example technique for sampling LiDAR detections along a predicted trajectory 510, in accordance with some embodiments of the present disclosure. More specifically, FIG. 5 depicts the LiDAR measurements (illustrated as white circles) in a height-range (z/d) space (e.g., where z represents the height of a profile point estimate and d represents the range from the ego-vehicle on an unrolled trajectory). As such, the sampling component 165 may identify LiDAR points in the local neighborhood of each 3D sampling location, and the fitting component 170 may use those sampled height values to fit a corresponding height value (illustrated as black circles in FIG. 5) in each local neighborhood.

Generally, the magnitude of the threshold 3D radius used by the sampling component 165 to sample height values from the registered point cloud may be selected to tailor the resolution of the surface fitting process. For example, sampling from a larger 3D radius around each 3D sampling location may reduce the resolution and capability of the estimated surface 180 to represent fine changes in the height of the surface profile (e.g., relatively smaller cracks in the road surface may not be represented in the estimated surface 180). On the other hand, if the threshold 3D radius is too small, there may not be enough LiDAR points for a robust estimation. As such, the threshold 3D radius may be tailored to correspond to the targeted use case (e.g., detection of small holes in the road or larger objects), and may be selected to balance accuracy against resolution. In some embodiments, the threshold 3D radius may be selected to correspond to the width of the wheels. For example, wheel trajectories may be bands that depend on wheel width (e.g., 200 millimeters wide or more), and it may not be beneficial to sample in a region that extends wider than the wheel width (e.g., some embodiments may use a threshold 3D radius that is half the wheel width). In some embodiments, the threshold 3D radius may be asymmetric, for example, with a smaller sampling band in the direction of navigation direction to capture smaller undulations of the height profile in that direction (e.g., some embodiments may use a radius of +/−50 millimeters in the driving direction and +/−200 millimeters along the wheel width). These are just a few examples, and other variations may be implemented within the scope of the present disclosure.

As such, the fitting component 170 may fit a height value to the LiDAR points sampled for each trajectory point using a nonlinear optimization such as a first-order method (e.g., gradient descent) or a second-order solver (e.g., a classical second-order least squares solver such as Levenberg-Marquardt). For example, a second-order solver typically uses analytic gradients, Jacobians, or Hessian matrices to achieve greater efficiency so it should require fewer iterations to converge, whereas a first-order method typically omits the use of analytical derivatives, providing a simpler implementation potentially at the cost of slower convergence. In some embodiments, the nonlinear optimization technique may be selected based on the applicable processor (e.g., some embodiments may use a gradient decent method on a graphics processing unit (GPU), or a least squares solver on a central processing unit (CPU)). In some embodiments, the optimization may be reduced to a 1D optimization that fits a height value to sampled LiDAR points represented in the height-range (z/d) space.

The nonlinear optimization may use a cost function that mitigates the impact of outlier observations (e.g., LiDAR points representing detected artifacts such as particles in the ambient weather such as snowflakes or rain drops, or ephemeral events such as condensate matter from vent plumes, dust particles, or exhaust), such as a cost function that aggregates a loss function quantifying the discrepancy between predicted and observed values (e.g., Cauchy or Huber loss). In some embodiments, one or more parameters of the cost function may be set based on a ground truth noise level estimated by the noise estimation component described above (e.g., by tuning $\sigma$ in the Cauchy loss function or $\delta$ in the Huber loss function based on the ground truth noise level).

Figure 6:
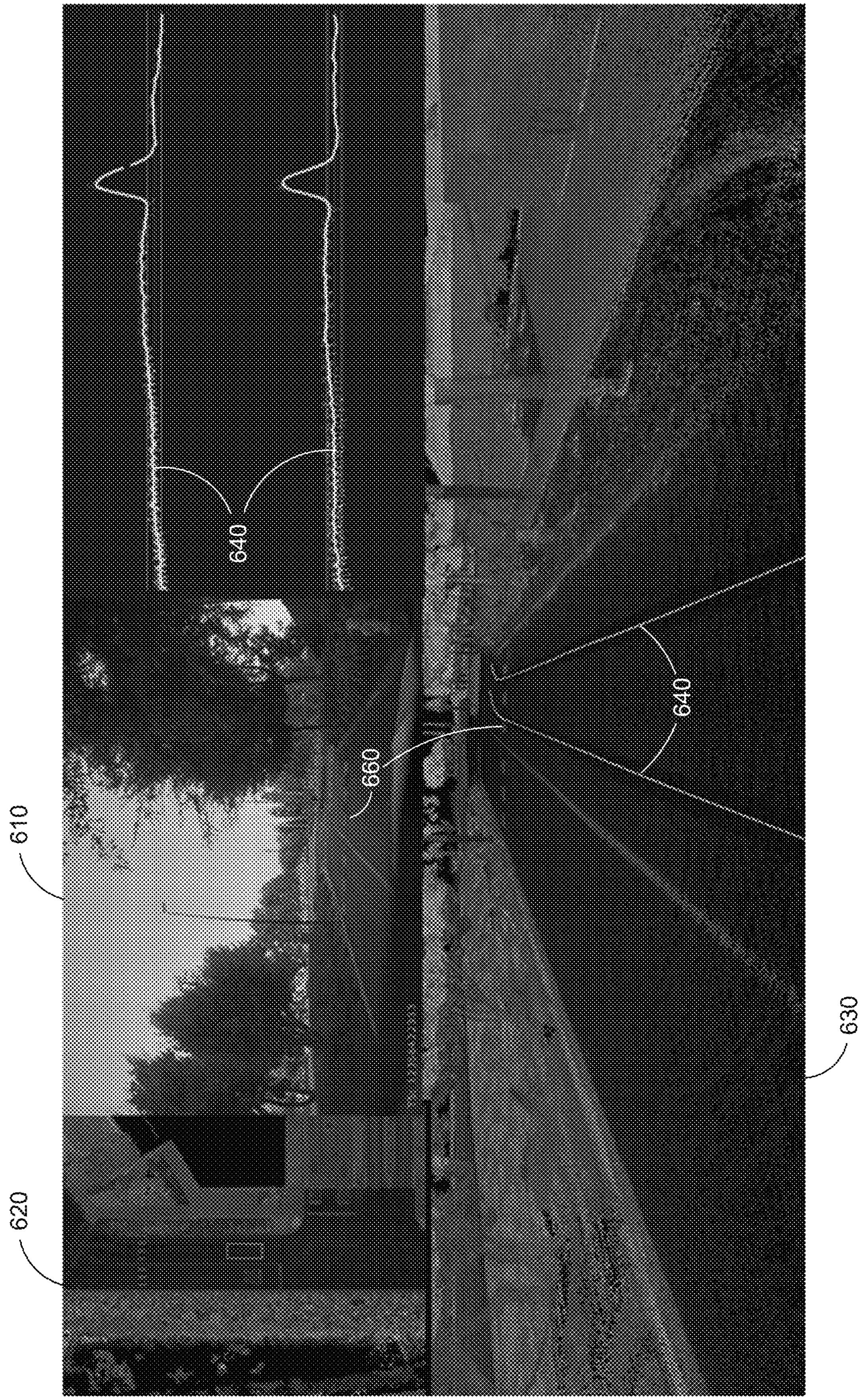
FIG. 6 illustrates an example road surface profile along two-wheel trajectories, in accordance with some embodiments of the present disclosure.

As such, the fitting component 170 may generate an optimized height (z) value for each trajectory point, collectively forming a 3D surface structure of the estimated surface 180 (e.g., a road surface profile). FIG. 6 illustrates an example road surface profile along two wheel trajectories 640 or tracks, in accordance with some embodiments of the present disclosure. This example illustrates a perspective view image 610 of a scene, as well as a corresponding top-down projection 620 and perspective projection 630 of an accumulated LiDAR point cloud representing the scene (computed through proof-of-concept offline processing). In this example, the trajectories 640 for the left and right wheels represent example predicted trajectories and extend approximately 20 meters from the ego-vehicle. The road surface profile includes two portions corresponding to the left and right wheel trajectories 640, with the peak representing the speed bump 660 detected ahead.

As such and returning to FIG. 1, the surface estimation component 140 may output a representation of the estimated surface 180, which may be used by the control component(s) 190 of the ego-machine to perform one or more operations. For example, the ego-machine may be an autonomous or semi-autonomous machine such as the autonomous vehicle 1500 of FIGS. 15A-15D, and the control component(s) 190 may include components such as the controller(s) 1536, the ADAS system 1538, adaptive suspension control system, and/or an autonomous driving software stack (such as the one described in U.S. Patent Application Publication No. 20210026355A1) executing on one or more components of the vehicle 1500 (e.g., the SoC(s) 1504, the CPU(s) 1518, the GPU(s) 1520, etc.). Accordingly, the surface estimation component 140 may provide the estimated surface 180 to control component(s) 190 such as these, and the control component(s) 190 may use any known technique to navigate, plan, or otherwise perform one or more operations (e.g., obstacle or protuberance avoidance, lane keeping, lane changing, merging, splitting, adapting a suspension system of the ego-machine to match the current surface profile, applying an early acceleration or deceleration based on an approaching surface slope, mapping, etc.) using the estimated surface 180.

Figure 7:
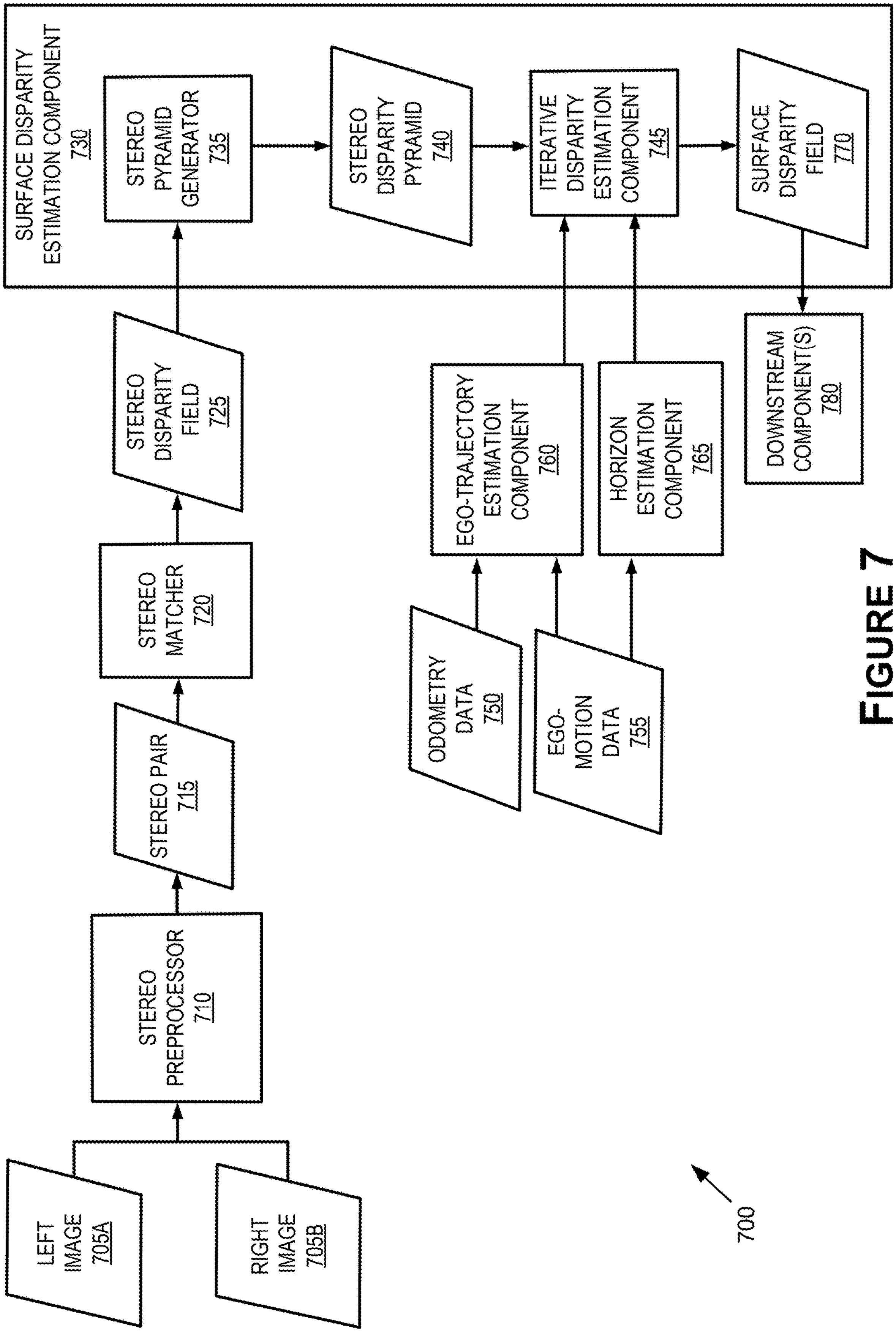
FIG. 7 is a data flow diagram illustrating an example surface disparity estimation pipeline, in accordance with some embodiments of the present disclosure.

In some embodiments, a 3D surface structure of surface in the environment (e.g., the ground) may be modeled and detected as a disparity field. FIG. 7 is a data flow diagram illustrating an example surface disparity estimation pipeline 700, in accordance with some embodiments of the present disclosure. At a high level, the surface disparity estimation pipeline 700 may use a constrained nonlinear hierarchical optimization to process stereo image data (e.g., left and right images 705*a* and 705*b*, respectively) and iteratively refine a surface disparity field 770 representing a surface in the environment (e.g., the ground) based on weights that guide the optimization to expected values for the surface.

In an example overview, a stereo preprocessor 710 may perform processing on the left and right images 705*a* and 705*b* (e.g., generated using one or more stereo cameras or pairs of non-stereo cameras of an ego-machine) to generate a stereo pair 715. A stereo matcher 720 may create a stereo disparity field 725 from the stereo pair 715, and a surface disparity estimation component 730 may generate a surface disparity field 770 representing a surface in the environment (e.g., the ground) by iteratively refining estimated disparity values using a constrained nonlinear optimization process that is tailored with one or more weights to directly solve for the surface disparity field 770 (e.g., a ground disparity field). As such, the surface disparity estimation component 730 may provide the surface disparity field 770 to one or more downstream components 780 for use in a variety of tasks, such as obstacle detection, segmentation of a navigable space, ego-motion refinement, and/or generation of an estimated surface profile.

More specifically, in some embodiments, an ego-machine (e.g., the autonomous vehicle 1500 of FIGS. 15A-15D) may be equipped with one or more stereo cameras (e.g., the stereo camera(s) 1568 of the autonomous vehicle 1500 of FIGS. 15A-15D), and the stereo cameras may be used to generate left and right images 705*a* and 705*b* (e.g., while the ego-machine navigates through an environment). In some embodiments, the left and right images 705*a* and 705*b* may be generated using a pair of non-stereo cameras, such as two cameras mounted on the ego-machine, separated by a fixed baseline distance (e.g., of ~0.22 meters), and synchronized to capture substantially simultaneous images of the scene. A trigger synchronization mechanism may be used to ensure that the two images are exposed and acquired at substantially the same time. The left and right images 705*a* and 705*b* may be generated at any frame rate, synchronized or otherwise paired, and processed by the surface disparity estimation pipeline 700 at any frame rate.

The stereo preprocessor 710 may use any known stereo processing technique to prepare the left and right images 705*a* and 705*b* for disparity computation, such as undistortion (e.g., the intrinsic camera calibration parameters may be applied in a non-linear warp to correct for lens distortions in the left and right images 705*a* and 705*b*), rectification (e.g., geometrically aligning the left and right images 705*a* and 705*b*), scaling (e.g., adjusting the size or resolution of the left and/or right images 705*a* and 705*b* to correspond to one another), and/or other techniques. As such, the stereo preprocessor 710 may process the left and right images 705*a* and 705*b* into a corresponding stereo pair 715.

In the example embodiment illustrated in FIG. 7, the surface disparity estimation pipeline 700 may estimate a smooth surface model (e.g., for the ground) using a multi-stage approach. In an initial stage, the stereo matcher 720 may use any known stereo matching technique to estimate a stereo disparity field 725 (e.g., local matching, global matching, semi-global matching, matching techniques that use machine learning models such as convolutional neural networks (CNNs) or transformers, etc.) at the highest image resolution. The stereo disparity field 725 typically represents the difference in the horizontal position of corresponding points in the left and right images of the stereo pair 715. From this high-resolution stereo disparity field 725, a stereo pyramid generator 735 of the surface disparity estimation component 730 may generate a stereo disparity pyramid 740 using a designated downsampling strategy. In a subsequent stage, an iterative disparity estimation component 745 of the surface disparity estimation component 730 may use a hierarchical, iterative, global optimization to estimate the surface disparity field 770. This hierarchical optimization may be achieved using image pyramids (e.g., implemented using a scale factor of 2, halving the resolution for each successive pyramid layer) and a (e.g., Gaussian) smoothing step. The number of pyramid layers may be designated based on the target resolution. As an example, 8-megapixel (MP) images may be downscaled to a resolution of approximately 3 MP, and the number of pyramid layers may be set to three, resulting in a top-level resolution of 0.5 MP. Although some embodiments estimate surface disparity values in multiple pyramid levels, this need not be the case. For example, the surface disparity estimation component 730 may generate a surface disparity field 770 by iteratively refining the stereo disparity field 725 to minimize a cost function without downsampling the stereo disparity field 725 or surface disparity field 770 into a corresponding image pyramid.

Figure 8:
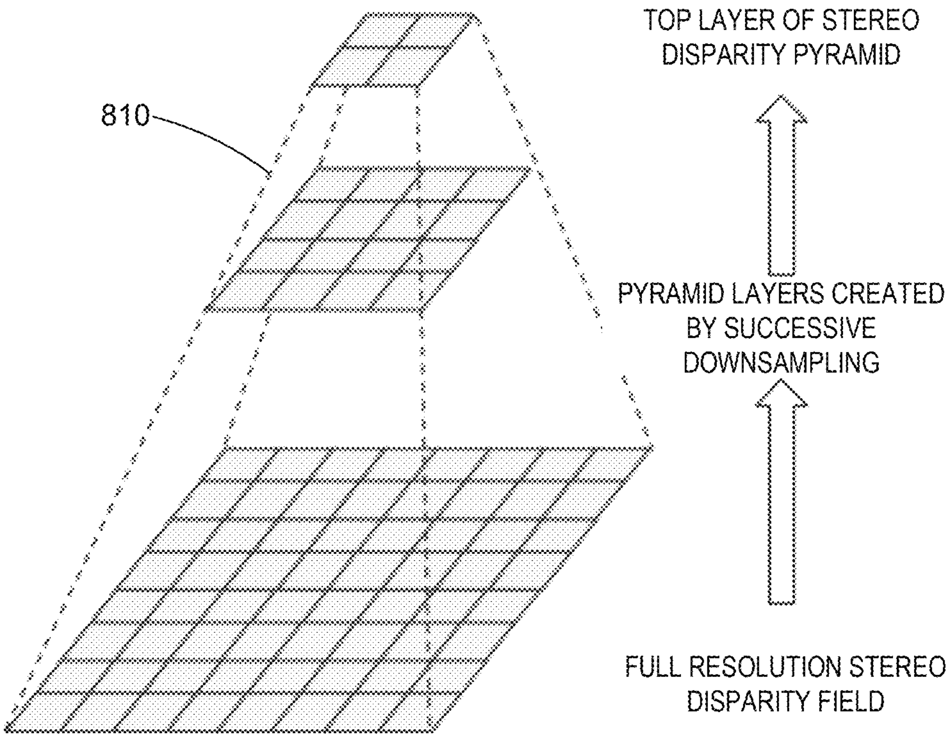
FIG. 8 illustrates an example stereo disparity pyramid and downsampling strategy, in accordance with some embodiments of the present disclosure.
Figure 8:
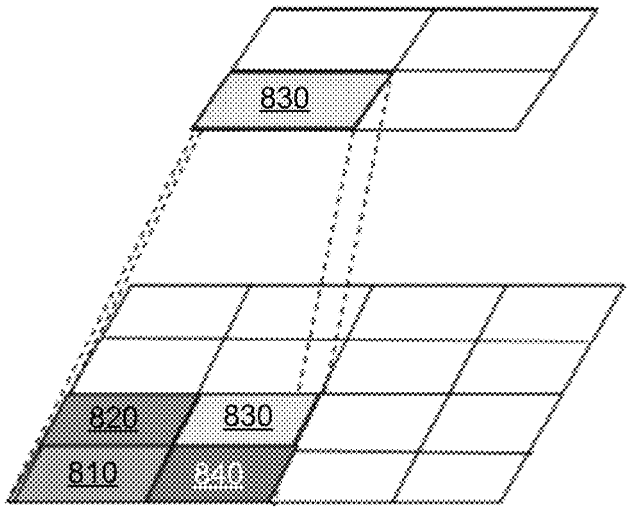

Continuing with the example illustrated in FIG. 7, the stereo matcher 720 may use a stereo matching technique (e.g., a hardware accelerated variant of Semi-Global Matching (SGM)) to estimate a stereo disparity field 725 at the highest image resolution from the stereo pair 715, and the stereo pyramid generator 735 may successively downsample the stereo disparity field 725 to create the stereo disparity pyramid 740. In some embodiments, the stereo pyramid generator 735 uses a downsampling scheme that emphasizes the importance of small disparity values (which represent far away objects). For example, the stereo pyramid generator 735 may combine four disparity values from a higher pyramid level into a single disparity using a min-filter that propagates the minimum value of the four disparity values to the next pyramid level. FIG. 8 illustrates an example stereo disparity pyramid 810 and downsampling strategy, in accordance with some embodiments of the present disclosure. In this example, FIG. 8 illustrates the full resolution at the bottom of the stereo disparity pyramid 810, and each layer may be successively downsampled to generate the next resolution stereo disparity image for the next pyramid layer above, until reaching some designated number of pyramid layers. The lower portion of FIG. 8 illustrates an example downsampling strategy using a min-filter in which four disparity values 810, 820, 830, and 840 in corresponding pixels or cells are downsampled to a single value by propagating their minimum value (in this example, disparity value 830). This is meant simply as an example, and variations may be implemented within the scope of the present disclosure.

As such, the iterative disparity estimation component 745 may use an iterative process to generate and iteratively refine (e.g., smooth) estimated surface disparity values for a designated surface (e.g., the ground) using a constrained hierarchical optimization that minimizes a cost function. In an example overview, the iterative disparity estimation component 745 may begin at the coarsest resolution pyramid layer (e.g., the highest pyramid layer), initializing the estimated surface disparity values to the stereo disparity values in the corresponding pyramid layer of the stereo disparity pyramid 740, and iteratively refining that layer using a nonlinear optimization until a designated criterion is met. For subsequent layers, the iterative disparity estimation component 745 may initialize the estimated surface disparity values by upsampling the refined disparities from the previous layer (e.g., by simple pixel duplication to generate four values in the target layer from one value of the source layer), iteratively refining those estimated surface disparity values, and repeating, progressing towards layers with increasing resolution until the base layer of the pyramid is reached. As such, the iterative disparity estimation component 745 may effectively estimate a surface disparity pyramid with different pyramid levels representing surface disparity fields with different resolutions, and the lowest level (highest resolution) may be used as the surface disparity field 770.

More specifically, starting at the coarsest layer of the surface disparity pyramid, the iterative disparity estimation component 745 may initialize estimated disparity values to the stereo disparity values in the corresponding pyramid layer of the stereo disparity pyramid 740, initialize corresponding weights, and iteratively smooth the estimated disparity values over any number of iterations using the weights. Generally, the estimated surface disparity values may take the form of a field, image, or grid of estimated surface disparity values corresponding to a 2D view represented by the left and right images 705*a* and 705*b*. In some embodiments, the iterative disparity estimation component 745 may smooth the estimated surface disparity values in the grid by minimizing (or approximating minimization of) a cost function that penalizes deviation between measured stereo disparity values from the stereo disparity pyramid 740 and estimated surface disparity values and/or that penalizes deviations among adjacent estimated values. For example, 3D structure of a surface (e.g., the ground) may be modeled using a grid of cells (e.g., an image or field), where each cell (or pixel) stores an estimated surface disparity value. As such, the iterative disparity estimation component 745 may generate a grid (or field) of initialized estimated surface disparity values and/or a corresponding grid (or field) of corresponding cell/pixel weights, and the iterative disparity estimation component 745 may iteratively smooth the grid of initialized estimated surface disparity values based on measured stereo disparity values from the stereo disparity pyramid 740 and the grid of weights (e.g., a weight map).

In some embodiments, the iterative disparity estimation component 745 calculates estimated surface disparity values that minimize (or approximate minimizing) a global cost function, such as:

$$C(g) = \sum_{p} w_p * \text{data\_cost}(h_p - g_p) + w_s * \sum_{p,q\epsilon N} \|g_p - g_q\|, \quad \text{(Eq. 1)}$$

where each cell or pixel p in the grid of estimated surface disparity values may be assigned a weight $w_p$ (e.g., a weight that emphasizes disparity values based on proximity to a predicted ego-trajectory, a weight that deemphasizes disparity values below a detected horizon line based on proximity to the detected horizon) and/or a measurement deviation weight (e.g., represented by data_cost) that penalizes deviation between measured stereo disparity values (derived from the left and right images 705*a* and 705*b*) and estimated surface disparity values (encouraging the optimization to converge to smaller disparities on the ground level), and where each cell or pixel q in a neighborhood N of p may be assigned a smoothness weight $w_s$ that weights the difference between estimated values of the neighboring cells or pixels q and the estimated value of the cell or pixel p. In this example, the global cost function of equation 1 includes a measurement term that encourages estimated values to approximate the measured values, and a smoothness term that penalizes large variations in a local neighborhood, thereby encouraging or enforcing smoothness in the estimated surface disparity field 770 (e.g., in order to model typical road surfaces). The use of a global cost function in an iterative approximation approach encourages propagation of current estimated values to a wide (e.g., global) neighborhood and helps to avoid getting stuck in local minima.

Generally, smaller stereo disparities represent objects or surfaces that are relatively farther away (and vice versa), so surface obstacles and the boundaries between the obstacles and the surface they are navigating such as the ground will typically have larger stereo disparities than the surface itself (which should appear relatively farther away and therefore be represented by relatively smaller stereo disparities). As such, the measurement term may incorporate a cost function that down weights larger estimated disparity values (e.g., obstacles) and/or encourages smaller estimated disparity values (e.g., the ground). For example, the measurement term may incorporate a cost and/or weight function that defines a measurement deviation weight that increases as the deviation between measured and estimated disparities increases, and/or that defines a different measurement deviation weight for measurements that are above an estimated value (e.g., measured disparities that are above an estimated surface) than for measurements that are below an estimated value (e.g., measured disparities that are below the estimated surface).

Figure 9:
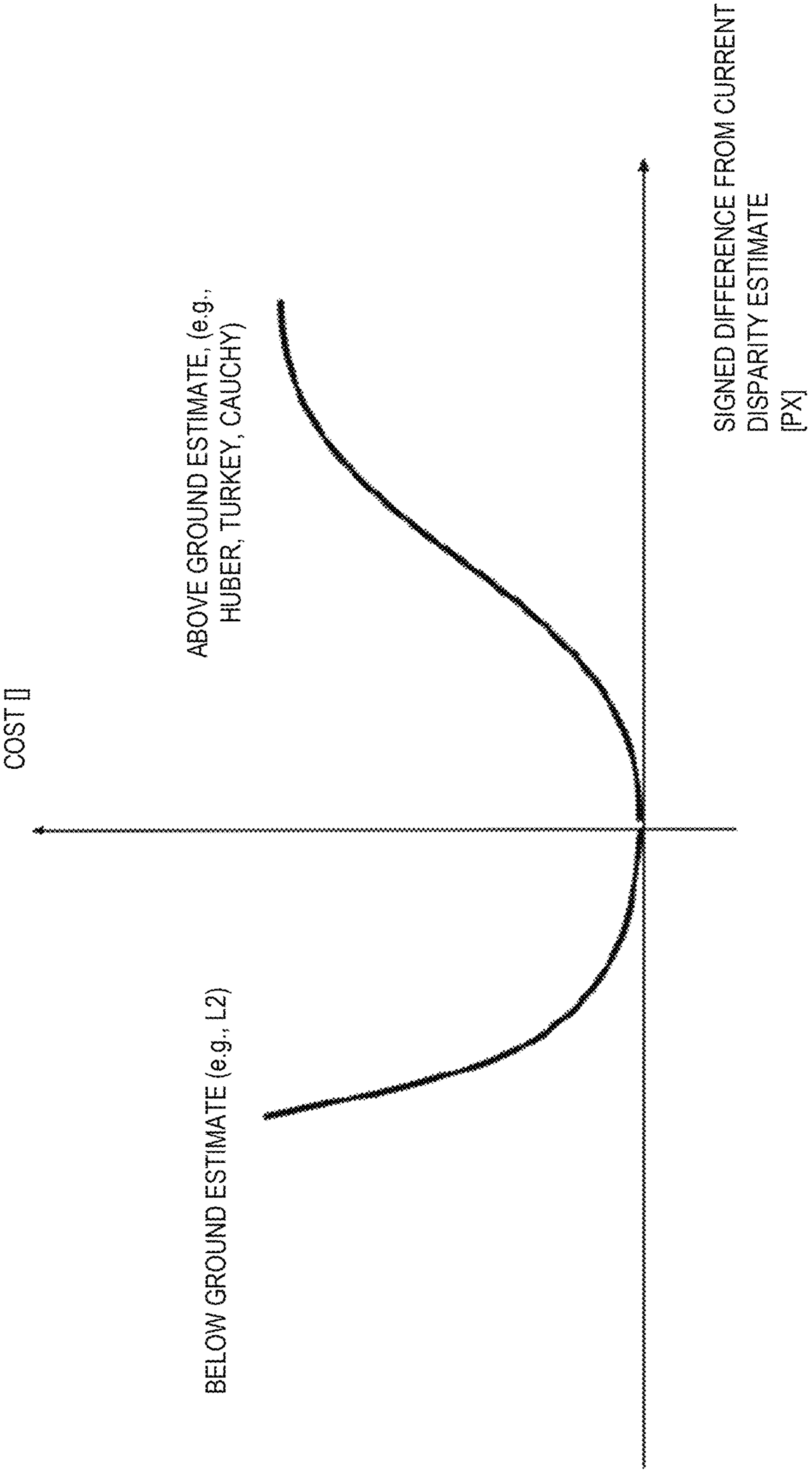
FIG. 9 illustrates an example asymmetric measurement deviation cost function, in accordance with some embodiments of the present disclosure.

FIG. 9 illustrates an example asymmetric measurement deviation cost function, in accordance with some embodiments of the present disclosure. In FIG. 9, the x-axis represents the signed difference (or deviation) between a measured disparity value and a currently estimated disparity value, and the y-axis represents an example cost which may be assigned. In this example, the cost function assigns a cost of zero when the deviation is zero, a symmetrical cost for small deviations, and an increasing cost the farther the estimate is from the measurement. Beyond some threshold positive and negative deviation, this example cost function is asymmetric. For example, if the measured disparity is substantially lower than the estimated disparity, these measurements are likely outliers (e.g., noise) below the (e.g., ground) surface, so their impact may be limited by assigning a higher cost (e.g., L2 or Huber). By contrast, if the measured disparity is substantially higher than the estimated disparity, these measurements are likely above the estimated (e.g., ground) surface, and may be assigned a cost (e.g., Huber, Turkey, Cauchy) that is high relative to measurements that are closer to the estimated surface but that rolls off such that measurements with increasing disparity values do not have an increasing impact. This roll off has the benefit that measured disparity values that are significantly higher than the cutoff distance (e.g., by some threshold) may be assigned a constant cost and a zero derivative, and therefore may avoid contributing to an estimated surface disparity when minimizing (or approximating minimization of) the cost function.

In some embodiments, the (e.g., asymmetric) measurement deviation cost function is be used (e.g., by the iterative disparity estimation component 745 of FIG. 7) to calculate a weight for a given cell or pixel based on a corresponding measurement deviation weight function (e.g., defined as the derivative of the measurement deviation cost function divided by deviation, except where the deviation is approximately zero in which case a fixed weight (e.g., 1) may be used). As such, in some embodiments, the iterative disparity estimation component 745 may assign each cell or pixel p in the representation of the estimated surface disparity values a measurement deviation weight.

Additionally or alternatively, the iterative disparity estimation component 745 may assign each cell or pixel p in the representation of the estimated surface disparity values a weight that emphasizes disparity values based on proximity to a predicted ego-trajectory, and/or a weight that deemphasizes disparity values below a detected horizon line based on proximity to the detected horizon.

Taking proximity to a predicted ego-trajectory as an example, an assumption may be made that the ego-machine is on a trajectory along the surface being estimated. As such, weights may be assigned to emphasize cells or pixels that are close to an estimated trajectory. Generally, an ego-trajectory may be estimated using any suitable technique. In the example illustrated in FIG. 7, the ego-machine may include corresponding sensors that produce odometry data 750 derived from measurements of the ego-machine's wheel rotations and ego-motion data 755 representing the ego-motion of the ego-machine (e.g., recorded using an IMU, GPS, or any other known technique), and an ego-trajectory estimation component 760 may use dead reckoning to estimate a trajectory (e.g., represented as a series of discrete positional states) based on the odometry data 750, and may use a Kalman filter to correct for drift based on the ego-motion data 755. This is just an example, and other ways of estimating a trajectory may be implemented within the scope of the present disclosure. As such, the ego-trajectory estimation component 760 may provide the estimated trajectory to the iterative disparity estimation component 745, which may sample the trajectory as a line, backproject it into camera space, and assign weights based on proximity to the backprojected trajectory (e.g., by assigning a weight such as 1 within a designated threshold distance of the backprojected trajectory, and decreasing weights or weights of zero with increased distance from the backprojected trajectory). In some embodiments, the ego-trajectory estimation component 760 may only use this weight during estimation of the first layer of the surface disparity pyramid.

Taking weighting based on a detected horizon line as an example, generally, disparity values at the horizon should be zero, and depending on the application, a surface being navigated is unlikely to appear above the horizon line in an image. As such, weights may be assigned to deemphasize cells or pixels based on position relative to a detected horizon line (e.g., so measured disparity values above the horizon have no impact on the estimation). Generally, a horizon may be detected using any suitable technique. In the example illustrated in FIG. 7, the ego-motion data 755 may include inertial measurements estimating the ego-machine's orientation, and a horizon estimation component 765 may use the corresponding pitch and roll relative to the horizontal plane to estimate the position of the horizon in camera space (e.g., by adjusting the vertical displacement of the horizon from the image center based on the pitch angle, adjusting the tilt of the horizon line based on the roll angle). As such, the ego-trajectory estimation component 760 may provide a representation of the detected horizon to the iterative disparity estimation component 745, which may assign weights that deemphasize cells or pixels on the detected horizon line, may assign higher or increasing weights with increasing distance below the detected horizon line, and/or may assign weights that cancel out contributions above the detected horizon line.

Figure 10:
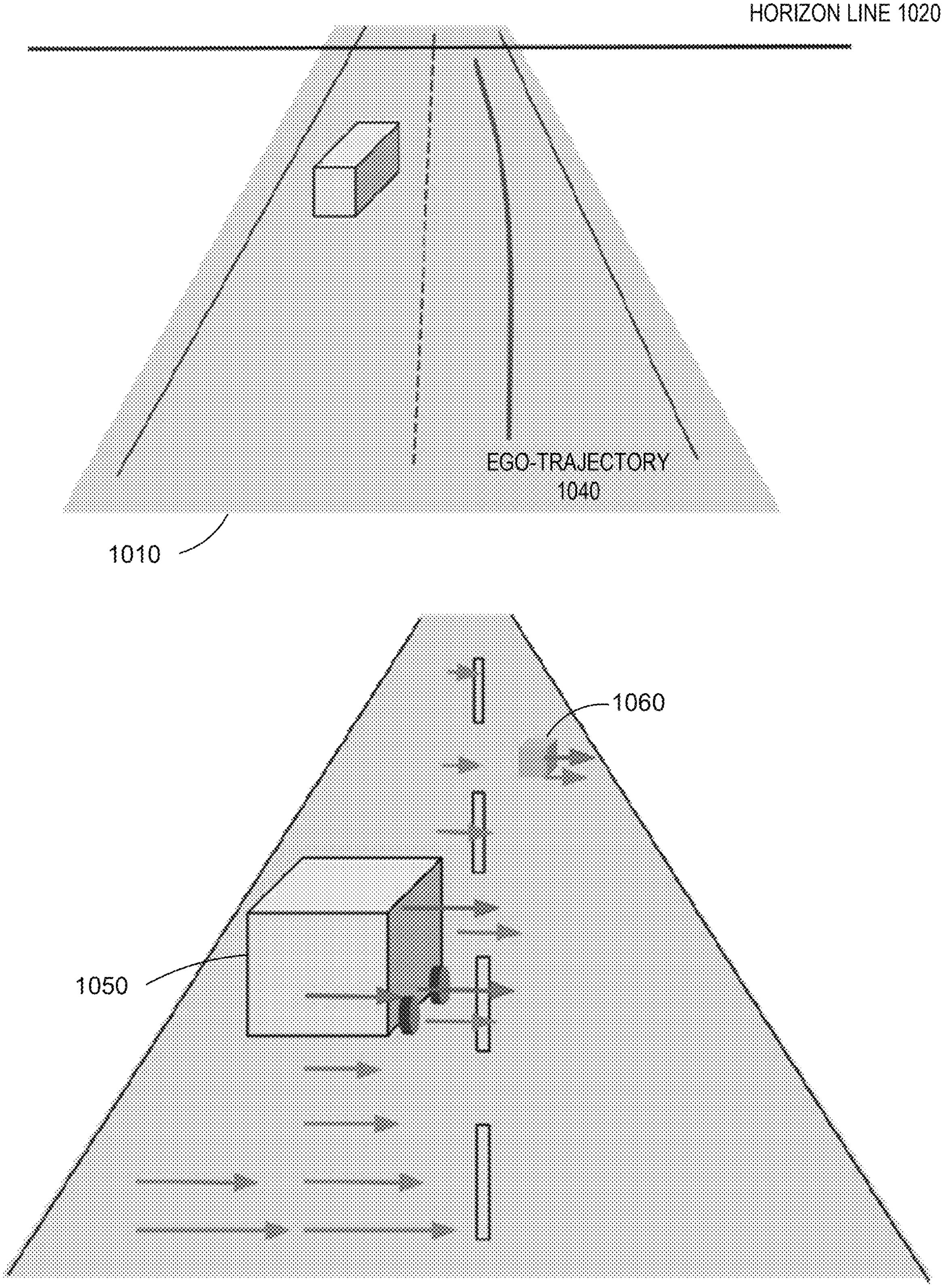
FIG. 10 illustrates some example techniques for guiding estimation of ground disparities, in accordance with some embodiments of the present disclosure.

As such, weighting based on an estimated trajectory and/or a detected horizon line may constrain and encourage the optimization to converge to disparity values of the navigable surface such as the ground. For example, FIG. 10 illustrates a region of interest 1010 when estimating a ground disparity field representing a straight road. The horizon line 1020 may be used to assign weights that constrain the optimization to focus on regions below and/or farther from the horizon line 1020 (e.g., during estimation of each layer), and the projected ego-trajectory 1040 may be used to assign weights that constrain the optimization to focus on cells or pixels that are proximate to the ego-trajectory 1040 (e.g., during estimation of the coarsest layer). The lower portion of FIG. 10 illustrates an example road segment with a vehicle 1050 and an obstacle 1060. Disparity values are represented by arrows of corresponding lengths. For a smooth surface such as this road segment, the variation of disparity values in a local neighborhood will typically be low. An asymmetric cost function may be used to encourage the optimization to converge to smaller disparity values, and a local smoothness prior may be used to enforce local consistency, encouraging the solution to converge towards a smooth disparity field.

Returning to FIG. 7 the iterative disparity estimation component 745 may generate one or more weights for each cell or pixel, and may combine different types of weights into a composite weight (e.g., based on averaging, weighted averaging, multiplication, addition, etc.). In some embodiments, the iterative disparity estimation component 745 generates weighted values (e.g., a grid of weighted measured disparities, a weighted measured value map) by applying weights (e.g., from the grid of weights) to the measured disparity values.

As such and taking estimation of the first level of a surface disparity pyramid as an example, depending on the embodiment, the iterative disparity estimation component 745 may initialize a grid (or field) of estimated surface disparity values using corresponding values from the stereo disparity pyramid 740, may generate a grid (or field) of corresponding cell/pixel weights and/or a grid (or field) of corresponding weighted measured disparities, and may apply smoothing to iteratively refine the (e.g., grid of) estimated surface disparity values based on the (e.g., grid of) weighted measured values and/or the (e.g., grid of) weights. In some embodiments, the iterative disparity estimation component 745 uses a non-linear optimization scheme that iteratively updates estimated disparity values, for example, by applying a weighted convolution to the grid of weighted measured values and/or the grid of weights, generating updated estimated values with new estimated values that result from dividing each smoothed weighted measured value by its corresponding smoothed weight, and updating the grid of weighted measured values and/or the grid of weights (e.g., in some embodiments that use a measurement deviation weight), for example, using the updated estimated values to update the measurement deviation weights and/or corresponding combined weights. The iterative disparity estimation component 745 may run for a designated number of iterations, or may use some other suitable termination criteria. In some embodiments, the iterative disparity estimation component 745 may skip updating regions where estimated disparity values have already converged (e.g., within a threshold) and proceed to updating the remaining areas.

In some embodiments in which the iterative disparity estimation component 745 operates on a multi-level hierarchical representation (e.g., an image pyramid), the iterative disparity estimation component 745 may initially apply smoothing at the coarsest level for any number of iterations. When the iterative disparity estimation component 745 terminates smoothing at a particular level, the iterative disparity estimation component 745 may upsample the smoothed and/or updated grids using any known technique to generate corresponding representations at the next level and may generate corresponding weights and apply smoothing at that level. As such, the process may be repeated, iteratively smoothing then up-sampling at each successive level, for example, until completing iterative smoothing at the original resolution. As such, the resulting (e.g., highest resolution) solution may be taken as the surface disparity field 770.

In an example variation of the implementation illustrated in FIG. 7, the stereo pyramid generator 735 may iteratively downsample the left and right images in the stereo pair 715 to derive an image pyramid for each stereo image, the stereo matcher 720 may perform stereo matching in the coarsest layer, and the iterative disparity estimation component 745 may iteratively refine estimated surface disparity values using a weight that emphasizes disparity values that correspond to higher intensity gradient consistency in the stereo images in the stereo pair 715, thereby encouraging the optimization to focus on regions that are likely to be part of the (e.g., road) surface. For example, the iterative disparity estimation component 745 may compute the intensity gradients of both images, compare the gradients at corresponding pixel locations, and assign higher weights to cells or pixels in the estimated disparity field that correspond to lower differences in intensity gradient. The iterative disparity estimation component 745 may additionally or alternatively assign a weight that emphasizes disparity values based on proximity to a predicted ego-trajectory and/or a weight that deemphasizes disparity values below a detected horizon line based on proximity to the detected horizon. As such, the iterative disparity estimation component 745 may iteratively refine using the weight(s), upsample, and pass the refined ground disparity values to the next, higher-resolution pyramid layer, and the iterative disparity estimation component 745 may repeat the process (e.g., calculating intensity gradients from a corresponding layer of the image pyramids for the stereo images in the stereo pair 715 to generate corresponding weights for each layer of refinement) until reaching and refining the highest-resolution layer.

In another example variation of the implementation illustrated in FIG. 7, the stereo pyramid generator 735 may iteratively downsample the left and right images in the stereo pair 715 to derive an image pyramid for each stereo image, the stereo matcher 720 may perform stereo matching in the coarsest layer, and the iterative disparity estimation component 745 may iteratively refine estimated surface disparity values in the coarsest layer using measurement deviation weights derived based on the difference between estimated surface disparity values and the disparity values in the coarse disparity image. The iterative disparity estimation component 745 may additionally or alternatively use a weight that emphasizes disparity values based on proximity to a predicted ego-trajectory and/or a weight that deemphasizes disparity values below a detected horizon line based on proximity to the detected horizon. In some embodiments, the iterative disparity estimation component 745 (or some other component) may use any known technique to refine the coarse disparity image using optical flow (e.g., using motion vectors estimated through optical flow to correct inconsistencies or artifacts, compensate for calibration inaccuracies, etc.), upsample and pass the coarse disparity image and coarse surface disparity field to the next, higher-resolution pyramid layer, and repeat the process (e.g., refining using measurement deviation weights derived based on the difference between the upsampled surface disparity field and the upsampled, refined disparity image) until reaching and refining the highest-resolution layer. These are just a few examples, and other variations may be implemented within the scope of the present disclosure.

As such, the surface disparity estimation component 730 may generate and provide a representation of a surface disparity field 770 (e.g., and the stereo disparity field 725) to the downstream component(s) 780 for use in a variety of tasks, such as obstacle detection, segmentation of a navigable space, ego-motion refinement, and/or generation of an estimated surface profile.

More specifically, in some embodiments, the downstream component(s) 780 may include an object detector that performs object detection based on the difference between the surface disparity field 770 and the stereo disparity field 725. For example, the object detector may lift the disparity values to 3D (e.g., by converting the disparity values to range values and backprojecting the range values into 3D space) to derive corresponding height values and apply a range-dependent threshold height to the difference between stereo and surface disparity values to detect obstacles based on their height above the estimated surface. In some embodiments, the object detector may apply a corresponding threshold directly in the disparity space by imposing a range-dependent threshold disparity difference. As such, if the disparity is larger in the surface disparity image than the stereo disparity image by more than a threshold amount, there is likely an object in a corresponding region, so the object detector may detect obstacles on the surface by taking the difference between surface and stereo disparities and applying a designated threshold to the difference. In some embodiments, the object detector may group pixels that satisfy a detection threshold into clusters and identify clusters with a threshold size and/or designated shape as detected objects. In some embodiments, the object detector may track and/or evaluate detected objects to confirm they appear in a threshold number of frames prior to confirming a detection. As such, the object detector may provide a representation of (confirmed) object detections to a control component(s) of the ego-machine (e.g., the control component(s) 190 of FIG. 1, the controller(s) 1536 or the ADAS system 1538 of the vehicle 1500 of FIGS. 15A-15D, an adaptive suspension control system, an autonomous driving software stack, etc.) to trigger one or more corresponding responses (e.g., path planning, emergency braking, etc.).

In some embodiments, the downstream component(s) 780 may include a navigable space detector that generates a representation of a navigable space based on the surface disparity field 770 (e.g., and the stereo disparity field 725). For example, the navigable space detector may classify the regions of the surface disparity field 770 (or regions of a difference image generated by subtracting the stereo disparity field 725 from the surface disparity field 770) where stereo and surface disparities are within a designated threshold as part of the surface, and may generate a representation of a navigable (e.g., drivable) space by radially casting 2D rays in the surface disparity field 770 (or the difference image) from a reference point (e.g., the position of the ego-machine, the closest surface location) in different directions to the first location where a disparity difference above the designated threshold (e.g., an obstacle) or a surface boundary is encountered. The navigable space detector may classify the area where rays travel without hitting any obstacles or boundaries as a navigable or drivable space, and the navigable space detector may use the points where rays intersect with obstacles or boundaries to generate a 2D contour delineating the boundary of the navigable space. As such, the navigable space detector may provide a representation of the navigable space (e.g., a backprojection of the 2D contour into 3D space) to a control component(s) of the ego-machine (e.g., the control component(s) 190 of FIG. 1, the controller(s) 1536 or the ADAS system 1538 of the vehicle 1500 of FIGS. 15A-15D, an adaptive suspension control system, an autonomous driving software stack, etc.) to trigger one or more corresponding responses (e.g., path planning, emergency braking, etc.).

In some embodiments, the downstream component(s) 780 may include an ego-motion refiner that compensates ego-motion estimates based on the surface disparity field 770. More specifically, the ego-motion refiner may ego-motion estimates (transforms) using instances of the surface disparity field 770 estimated for successive frames, for example, by lifting their disparity values to 3D (e.g., converting the disparity values into range values and backprojecting them into 3D space) to generate a 3D point cloud corresponding to the surface disparity field 770 estimated for each of any number of frames. As such, the ego-motion refiner may register the 3D point clouds using any known technique (e.g., ICP, point-to-surface matching) to estimate a relative transform between 3D point clouds, and the relative transform may be used to refine an initial ego-motion transform generated by ego-motion compensation. In some embodiments, the ego-motion refiner corresponds to at least a portion of the ego-motion refinement component 150 of FIG. 1.

In some embodiments, the downstream component(s) 780 may include a surface profile estimation component that estimates a surface profile based on the surface disparity field 770. For example, the surface profile estimation component may lift the surface disparity field 770 to 3D to generate a corresponding 3D point cloud, and the resulting lifted point cloud may be interpreted as a surface model. As such, the surface profile estimation component may generate a surface profile by sampling the lifted point cloud (or multiple, accumulated, lifted point clouds) along one or more predicted trajectories and fit the height of each trajectory point to the heights of the corresponding sampled points using a nonlinear optimization. As such, the surface profile estimation component may provide a representation of the surface profile to a control component(s) of the ego-machine (e.g., the control component(s) 190 of FIG. 1, the controller(s) 1536 or the ADAS system 1538 of the vehicle 1500 of FIGS. 15A-15D, an adaptive suspension control system, an autonomous driving software stack, etc.) to trigger one or more corresponding responses (e.g., obstacle or protuberance avoidance, lane keeping, lane changing, merging, splitting, adapting a suspension system of the ego-machine to match the current surface profile, applying an early acceleration or deceleration based on an approaching surface slope, mapping, etc.). In some embodiments, the surface profile estimation component corresponds to the surface estimation component 140 of FIG. 1.

Now referring to FIGS. 11-14, each block of methods 1100-1400, described herein, comprises a computing process that may be performed using any combination of hardware, firmware, and/or software. For instance, various functions may be carried out by a processor executing instructions stored in memory. The methods 1100-1400 may also be embodied as computer-usable instructions stored on computer storage media. The methods 1100-1400 may be provided by a standalone application, a standalone service, a hosted service (standalone or in combination with another hosted service), or a plug-in to another product, to name a few. In addition, the methods 1100-1400 are described, by way of example, with respect to the example surface estimation pipeline 100 of FIG. 1 or the example surface disparity estimation pipeline 700 of FIG. 7. However, these methods may additionally or alternatively be executed by any one system, or any combination of systems, including, but not limited to, those described herein.

Figure 11:
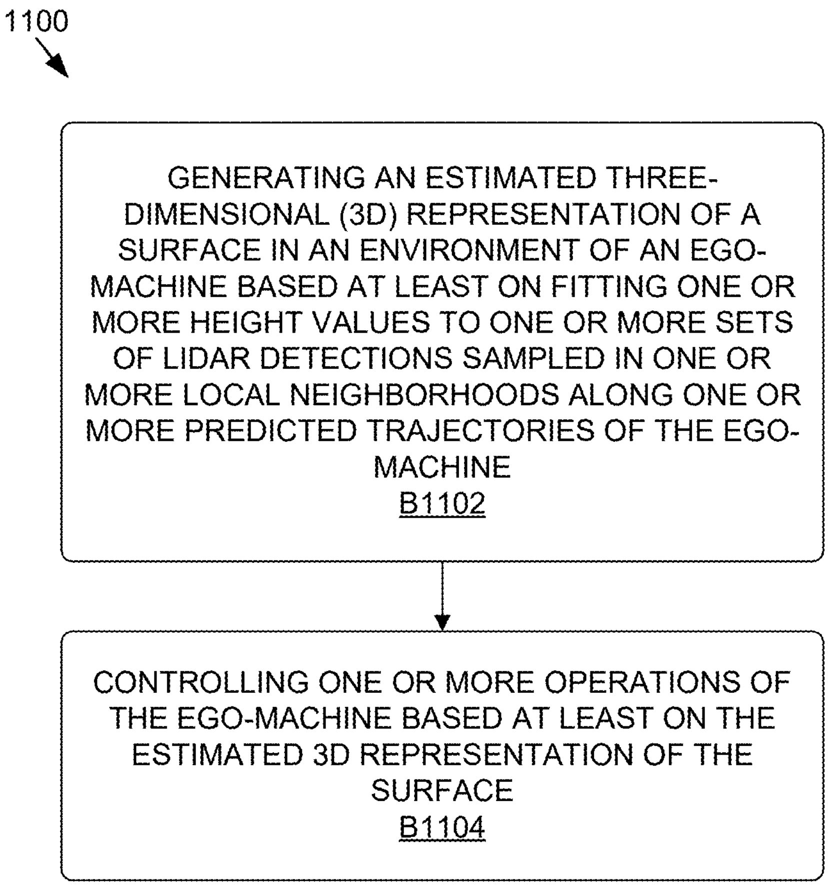
FIG. 11 is a flow diagram illustrating a method for surface estimation based at least on fitting height values in one or more local neighborhoods, in accordance with some embodiments of the present disclosure.

FIG. 11 is a flow diagram illustrating a method 1100 for surface estimation based at least on fitting height values in one or more local neighborhoods, in accordance with some embodiments of the present disclosure. The method 1100, at block B1102, includes generating an estimated three-dimensional (3D) representation of a surface in an environment of an ego-machine based at least on fitting one or more height values to one or more sets of LiDAR detections sampled in one or more local neighborhoods along one or more predicted trajectories of the ego-machine. For example, with respect to the surface estimation pipeline 100 of FIG. 1, the surface estimation component 140 may accumulate motion-compensated LiDAR data 110 in a sampling queue 175, sample the accumulated LiDAR data from the sampling queue 175 along one or more predicted trajectories generated by the path generator 130, and fit a height value for each trajectory point to the heights of corresponding sampled points using a nonlinear optimization.

The method 1100, at block B1104, includes controlling one or more operations of the ego-machine based at least on the estimated 3D representation of the surface. For example, with respect to the surface estimation pipeline 100 of FIG. 1, the estimated surface 180 (e.g., a road surface profile modeled along the wheel track(s) of the ego-machine) may be provided to a control component(s) 190 of the ego-machine, such as an adaptive suspension control system that uses the estimated surface 180 to modulate the damping characteristic of the ego-machine's suspension system to counteract indentations (e.g., potholes) or protrusions (e.g., speed bumps) represented in the estimated surface 180.

Figure 12:
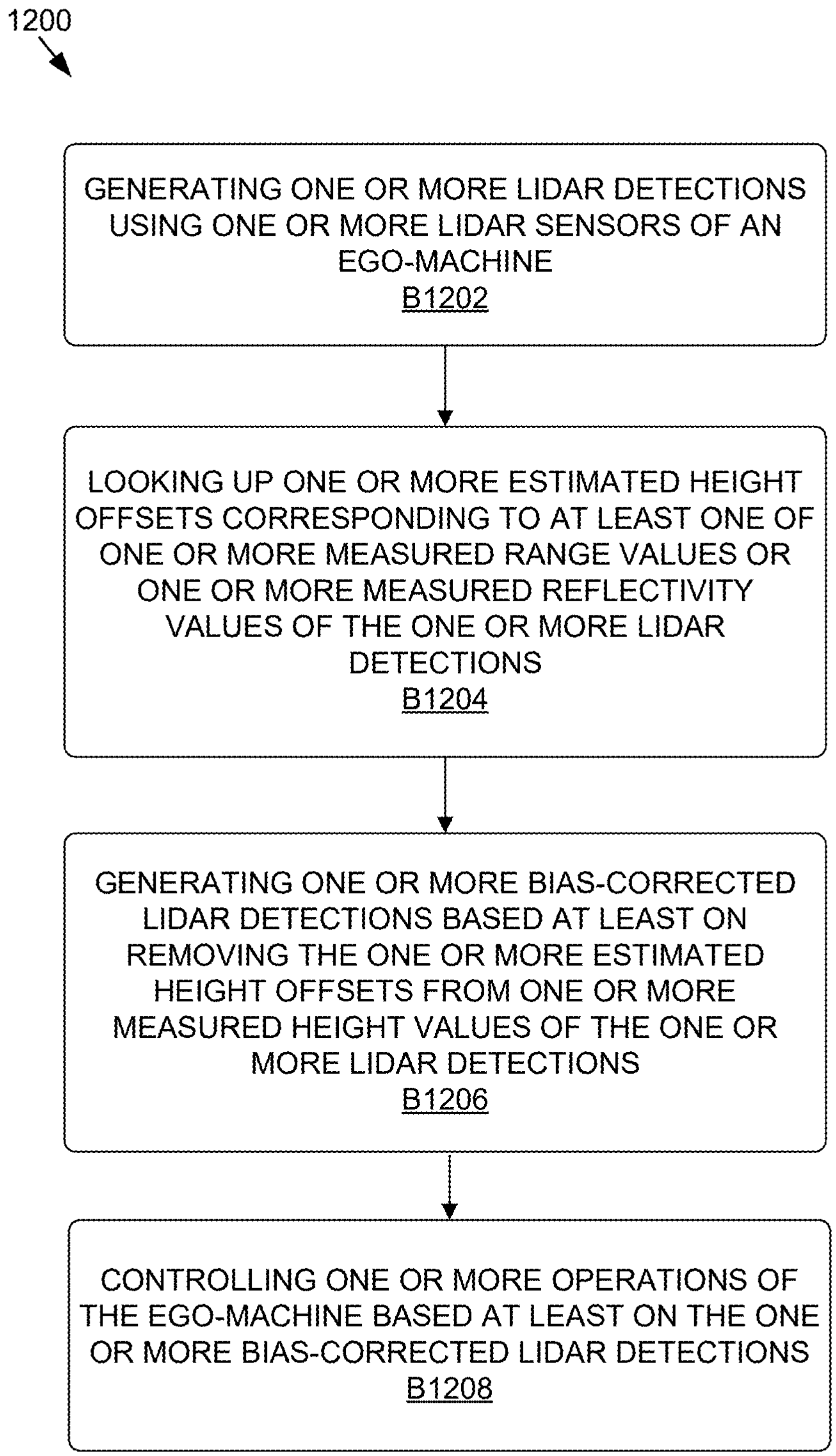
FIG. 12 is a flow diagram illustrating a method for generating bias-corrected LiDAR detections, in accordance with some embodiments of the present disclosure.

FIG. 12 is a flow diagram illustrating a method 1200 for generating bias-corrected LiDAR detections, in accordance with some embodiments of the present disclosure. The method 1200, at block B1202, includes generating one or more LiDAR detections using one or more LiDAR sensors of an ego-machine. For example, with respect to the surface estimation pipeline 100 of FIG. 1, an ego-machine (e.g., the autonomous vehicle 1500 of FIGS. 15A-15D) may be equipped with one or more LiDAR sensors (e.g., LiDAR sensor(s) 1564 of FIG. 15A), and the LiDAR sensors may be used to generate LiDAR data 101 (e.g., while the ego-machine navigates through an environment).

The method 1200, at block B1204, includes looking up one or more estimated height offsets corresponding to at least one of one or more measured range values or one or more measured reflectivity values of the one or more LiDAR detections, and at block B1206, includes generating one or more bias-corrected LiDAR detections based at least on removing the one or more estimated height offsets from one or more measured height values of the one or more LiDAR detections. For example, with respect to the surface estimation pipeline 100 of FIG. 1, the bias correction component 145 may compensate height values of (e.g., measured, motion-compensated, registered) LiDAR points by looking up and subtracting a range-dependent height bias corresponding to the measured range, and/or by looking up and subtracting a reflectivity-dependent height bias corresponding to the measured reflectivity.

The method 1200, at block B1208, includes controlling one or more operations of the ego-machine based at least on the one or more bias-corrected LiDAR detections. For example, with respect to the surface estimation pipeline 100 of FIG. 1, the surface estimation component 140 may sample (e.g., accumulated, registered) bias-corrected LiDAR data from the sampling queue 175 along one or more predicted trajectories (e.g., generated by the path generator 130) and fit a height value for each trajectory point to the heights of corresponding sampled points using a nonlinear optimization, and the resulting estimated surface 180 (e.g., a road surface profile modeled along the wheel track(s) of the ego-machine) may be provided to a control component(s) 190 of the ego-machine, such as an adaptive suspension control system that uses the estimated surface 180 to modulate the damping characteristic of the ego-machine's suspension system to counteract indentations (e.g., potholes) or protrusions (e.g., speed bumps) represented in the estimated surface 180. Although various embodiments described herein contemplate correction of LiDAR measurement bias for the purposes of surface estimation, bias-corrected LiDAR data may be used for any suitable task, such as those used in augmented reality, virtual reality, mixed reality, robotics, security and surveillance, autonomous or semi-autonomous machine applications, and/or any other technology spaces.

Figure 13:
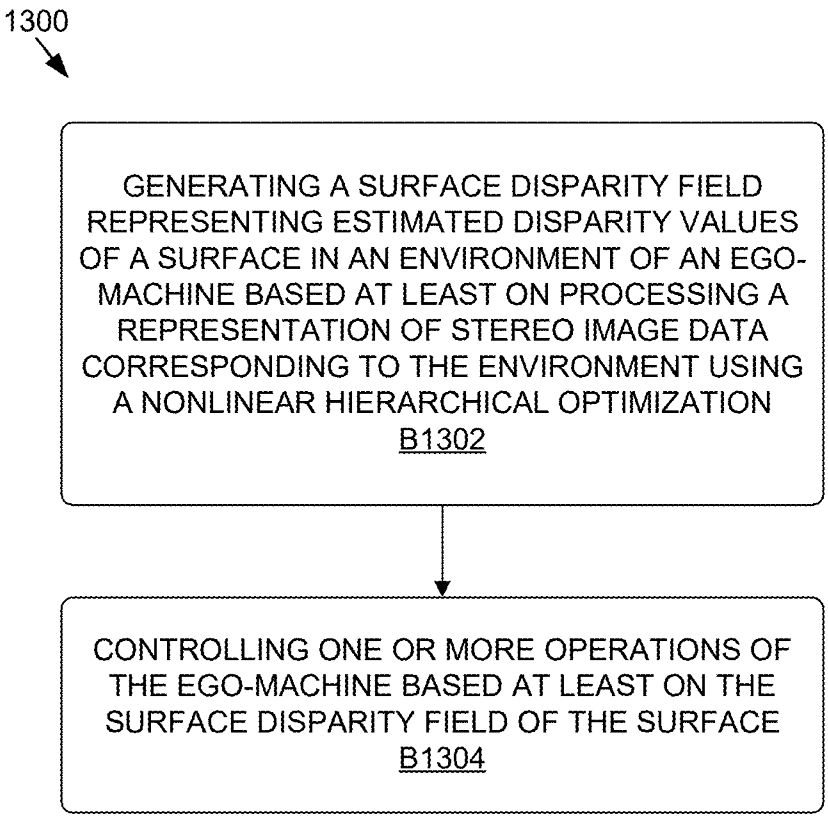
FIG. 13 is a flow diagram illustrating a method for generating a surface disparity field representing estimated disparity values of a surface in an environment, in accordance with some embodiments of the present disclosure.

FIG. 13 is a flow diagram illustrating a method 1300 for generating a surface disparity field representing estimated disparity values of a surface in an environment, in accordance with some embodiments of the present disclosure. The method 1300, at block B1302, includes generating a surface disparity field representing estimated disparity values of a surface in an environment of an ego-machine based at least on processing a representation of stereo image data corresponding to the environment using a nonlinear hierarchical optimization. For example, with respect to the surface disparity estimation pipeline 700 of FIG. 7, the surface disparity estimation component 730 may generate a surface disparity field 770 representing a surface in the environment (e.g., the ground) by iteratively refining estimated disparity values using a constrained nonlinear hierarchical optimization tailored with one or more weights to directly solve for the surface disparity field 770 (e.g., a ground disparity field).

The method 1300, at block B1304, includes controlling one or more operations of the ego-machine based at least on the surface disparity field of the surface. For example, with respect to the surface disparity estimation pipeline 700 of FIG. 7, the surface disparity estimation component 730 may provide the surface disparity field 770 to one or more downstream components 780 for use in a variety of tasks, such as obstacle detection, segmentation of a navigable space, ego-motion refinement, and/or generation of an estimated surface profile.

Figure 14:
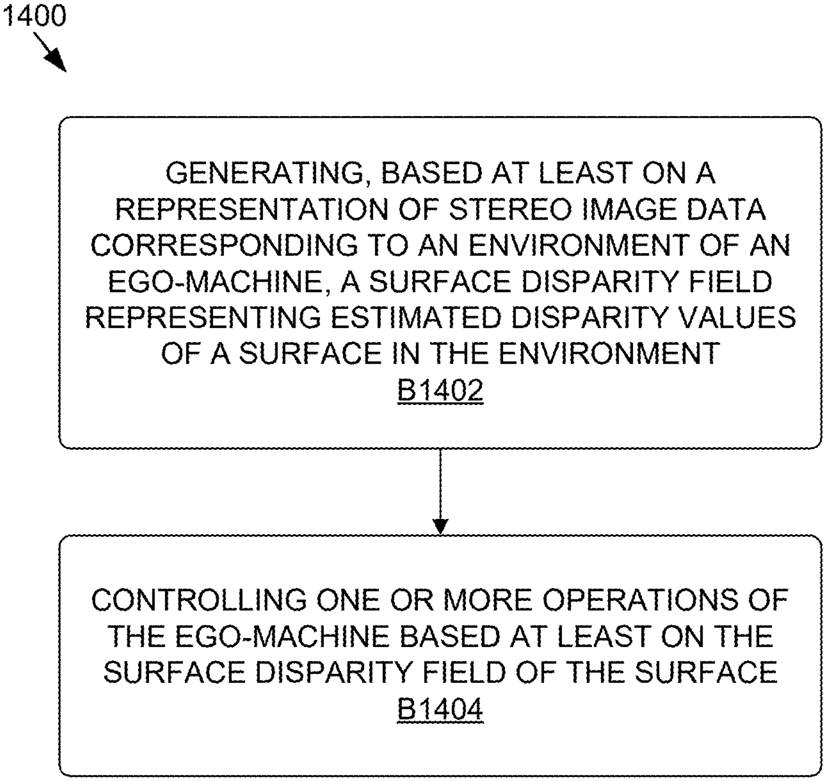
FIG. 14 is a flow diagram illustrating a method for controlling one or more operations of an ego-machine based at least on a surface disparity field, in accordance with some embodiments of the present disclosure.

FIG. 14 is a flow diagram illustrating a method 1400 for controlling one or more operations of an ego-machine based at least on a surface disparity field, in accordance with some embodiments of the present disclosure. The method 1400, at block B1402, includes generating, based at least on a representation of stereo image data corresponding to an environment of an ego-machine, a surface disparity field representing estimated disparity values of a surface in the environment. For example, with respect to the surface disparity estimation pipeline 700 of FIG. 7, the surface disparity estimation component 730 may generate a surface disparity field 770 representing a surface in the environment (e.g., the ground) by iteratively refining estimated disparity values using a constrained nonlinear hierarchical optimization tailored with one or more weights to directly solve for the surface disparity field 770 (e.g., a ground disparity field).

The method 1400, at block B1404, includes controlling one or more operations of the ego-machine based at least on the surface disparity field of the surface. For example, with respect to the surface disparity estimation pipeline 700 of FIG. 7, the surface disparity estimation component 730 may provide the surface disparity field 770 to one or more downstream components 780 for use in a variety of tasks, such as obstacle detection, segmentation of a navigable space, ego-motion refinement, and/or generation of an estimated surface profile.

The systems and methods described herein may be used by—or may be used in combination with—without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), distributed or collaborative content creation for 3D assets (e.g., using universal scene descriptor (USD) data, such as OpenUSD, and/or other data types), cloud computing, generative artificial intelligence (e.g., using one or more diffusion models, transformer models, etc.), language model applications (e.g., large language models (LLMs), vision language models (VLMs), etc.), and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot or robotic platform, aerial systems, medical systems, boating systems, smart area monitoring systems, systems for performing deep learning operations, systems for performing simulation operations (e.g., in a driving or vehicle simulation, in a robotics simulation, in a smart cities or surveillance simulation, etc.), systems for performing digital twin operations (e.g., in conjunction with a collaborative content creation platform or system, such as, without limitation, NVIDIA's OMNIVERSE and/or another platform, system, or service that uses USD or OpenUSD data types), systems implemented using an edge device, systems incorporating one or more virtual machines (VMs), systems for performing synthetic data generation operations (e.g., using one or more neural rendering fields (NERFs), gaussian splat techniques, diffusion models, transformer models, etc.), systems implemented at least partially in a data center, systems for performing conversational AI operations, systems implementing one or more language models—such as one or more large language models (LLMs), one or more vision language models (VLMs), one or more multi-modal language models, etc., systems for performing light transport simulation, systems for performing collaborative content creation for 3D assets (e.g., using universal scene descriptor (USD) data, such as OpenUSD, computer aided design (CAD) data, 2D and/or 3D graphics or design data, and/or other data types), systems implemented at least partially using cloud computing resources, and/or other types of systems.

In some embodiments, the systems and methods described herein may be performed within a simulation environment (e.g., NVIDIA's DriveSIM) using simulated data (e.g., simulated sensor data of simulated sensors of a simulated machine). For example, simulated (or virtual) LiDAR (e.g., accumulated, bias-corrected) data (e.g., representing a simulated environment such as highway or warehouse environment from the perspective of one or more simulated sensors of a simulated ego-machine) may be used to estimate a 3D surface structure (e.g., a road surface profile) using a nonlinear optimization to fit height values to the LiDAR data (e.g., sampled in localized regions along one or more predicted trajectories). In some embodiments, the 3D surface structure may be modeled as a disparity field, and a surface disparity field representing a simulated surface in the simulated environment (e.g., the ground) may be generated using a constrained nonlinear hierarchical optimization to process simulated stereo image data and iteratively refine estimated surface disparity values based on weights that guide the optimization to expected surface values (e.g., ground, road). As such, the estimated 3D surface structure may be used to control the simulated ego-machine within the simulated environment. These simulated operations may be used to test performance of the underlying algorithms, systems, and/or processes prior to deploying them in the real-world. In some instances, the simulation may be used to generate synthetic training data—e.g., images of a simulated environment generated from the perspective of one or more simulated sensors of a simulated ego-machine, and the synthetic training data (in addition or as an alternative to real-world data) may be used to train a multi-modal language model (e.g., a VLM). In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

Example Autonomous Vehicle

FIG. 15A is an illustration of an example autonomous or semi-autonomous vehicle or machine 1500, in accordance with some embodiments of the present disclosure. The autonomous or semi-autonomous vehicle or machine 1500 (alternatively referred to herein as the "vehicle 1500," "machine 1500," "ego-vehicle 1500," "ego-machine 1500," "robot 1500," etc.) may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. The vehicle 1500 may be capable of functionality in accordance with one or more of Level 1-Level 5 of the autonomous driving levels. For example, the vehicle 1500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1500 or other machine, such as being fully autonomous, being highly autonomous, being conditionally autonomous, being partially autonomous, providing assistive autonomy, being semi-autonomous, being primarily autonomous, or other designation.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to allow the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to allow autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems ("GNSS") sensor(s) 1558 (e.g., Global Positioning System sensor(s)), RADAR sensor(s) 1560, ultrasonic sensor(s) 1562, LiDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), one or more occupant monitoring system (OMS) sensor(s) 1501 (e.g., one or more interior cameras), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the High Definition ("HD") map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1526 may also allow communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 15B:
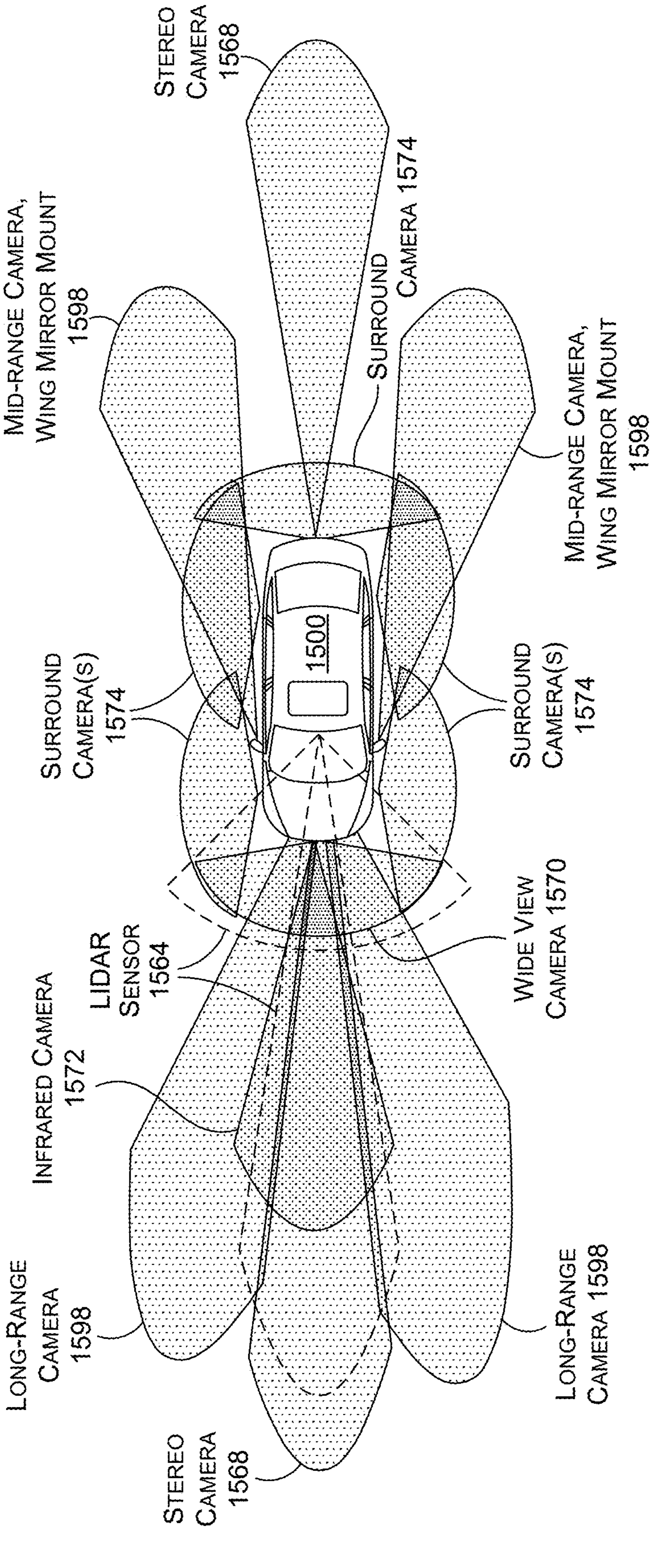
FIG. 15B is an example of camera locations and fields of view for the example autonomous vehicle of FIG. 15A, in accordance with some embodiments of the present disclosure.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may be any number (including zero) of wide-view cameras 1570 on the vehicle 1500. In addition, any number of long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

Any number of stereo cameras 1568 may also be included in a front-facing configuration. In at least one embodiment, one or more of stereo camera(s) 1568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

Cameras with a field of view that include portions of the interior environment within the cabin of the vehicle 1500 (e.g., one or more OMS sensor(s) 1501) may be used as part of an occupant monitoring system (OMS) such as, but not limited to, a driver monitoring system (DMS). For example, OMS sensors (e.g., the OMS sensor(s) 1501) may be used (e.g., by the controller(s) 1536) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to allow gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 15C:
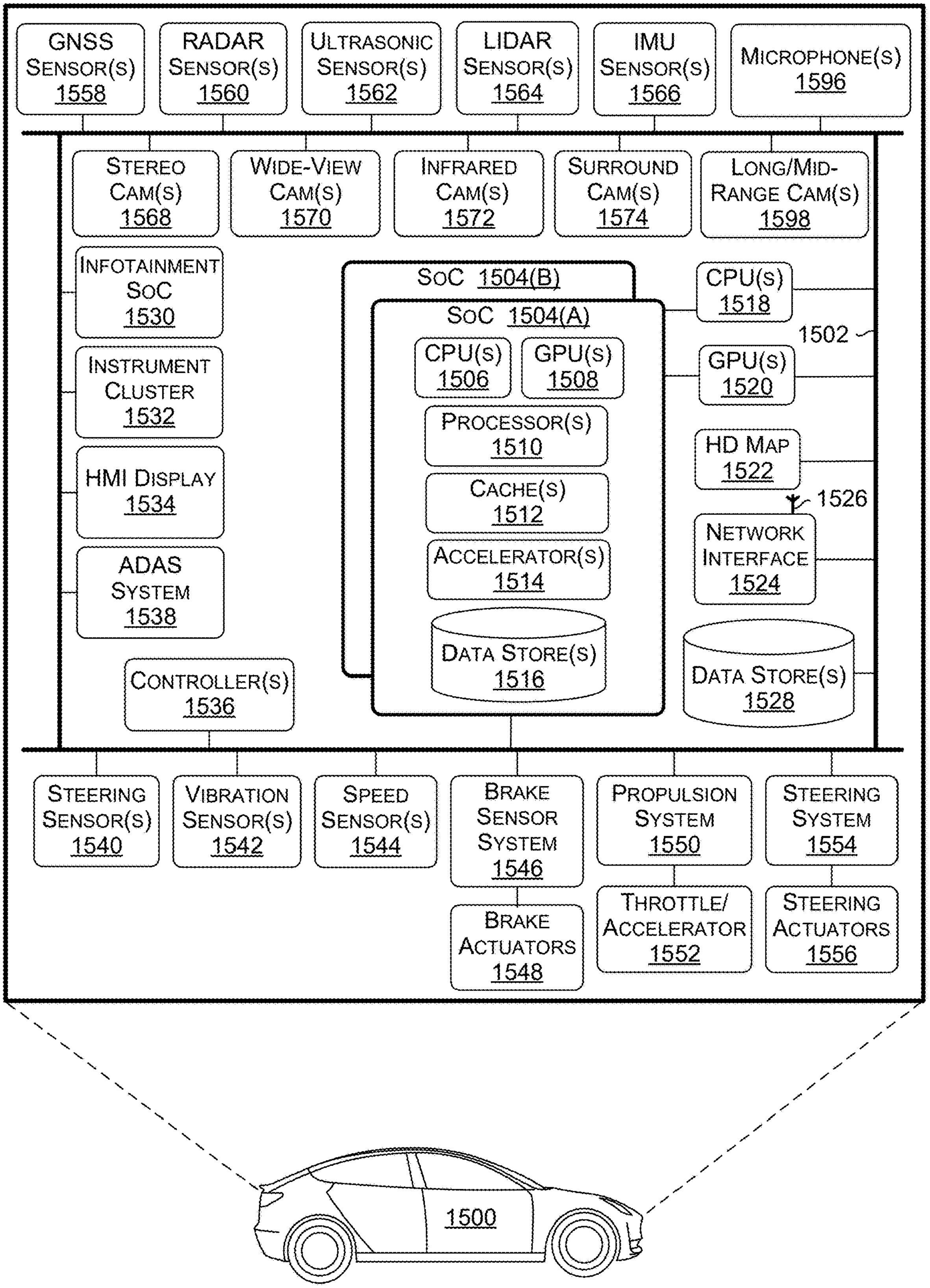
FIG. 15C is a block diagram of an example system architecture for the example autonomous vehicle of FIG. 15A, in accordance with some embodiments of the present disclosure.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation allowing any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to allow finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))—or other math coprocessor or numeric coprocessor types—for performing mathematical operations within the system. For example, the SoC(s) 1504 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may allow the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may allow components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. Pat. No. 10,885,698, issued on Jan. 5, 2021. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. As such, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LiDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1516 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ringoscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to allow communication with peripherals, audio codecs, power management, and/or other devices. The SoC(s) 1504 may be used to process data from cameras (e.g., connected over Gigabit Multimedia Serial Link and Ethernet), sensors (e.g., LiDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to allow Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to allow wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS, assisted GPS sensors, differential GPS (DGPS) sensors, etc.), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated using the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LiDAR sensor(s) 1564. The LiDAR sensor(s) 1564 may be used for object and pedestrian detection, emergency braking, collision avoidance, and/or other functions. The LiDAR sensor(s) 1564 may be functional safety level ASIL B. In some examples, the vehicle 1500 may include multiple LiDAR sensors 1564 (e.g., two, four, six, etc.) that may use Ethernet (e.g., to provide data to a Gigabit Ethernet switch).

In some examples, the LiDAR sensor(s) 1564 may be capable of providing a list of objects and their distances for a 360-degree field of view. Commercially available LiDAR sensor(s) 1564 may have an advertised range of approximately 1500 m, with an accuracy of 2 cm-3 cm, and with support for a 1500 Mbps Ethernet connection, for example. In some examples, one or more non-protruding LiDAR sensors 1564 may be used. In such examples, the LiDAR sensor(s) 1564 may be implemented as a small device that may be embedded into the front, rear, sides, and/or corners of the vehicle 1500. The LiDAR sensor(s) 1564, in such examples, may provide up to a 120-degree horizontal and 35-degree vertical field-of-view, with a 200 m range even for low-reflectivity objects. Front-mounted LiDAR sensor(s) 1564 may be configured for a horizontal field of view between 45 degrees and 135 degrees. FIG. 15B illustrates example long-range and short-range horizontal fields-of-view for a LiDAR sensor 1564 with an example mounting location above the windshield, but other configurations such as those that include a grille-mounted LiDAR sensor 1564 (e.g., as illustrated in FIG. 15A) and/or a roof-mounted LiDAR scanner (e.g., for a data collection vehicle) are possible.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may allow the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LiDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1500), while the I2V communication concept provides information about traffic further ahead. CACC systems may include either or both I2V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, Wi-Fi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. As such, the instrument cluster 1532 may be included as part of the infotainment SoC 1530, or vice versa.

Figure 15D:
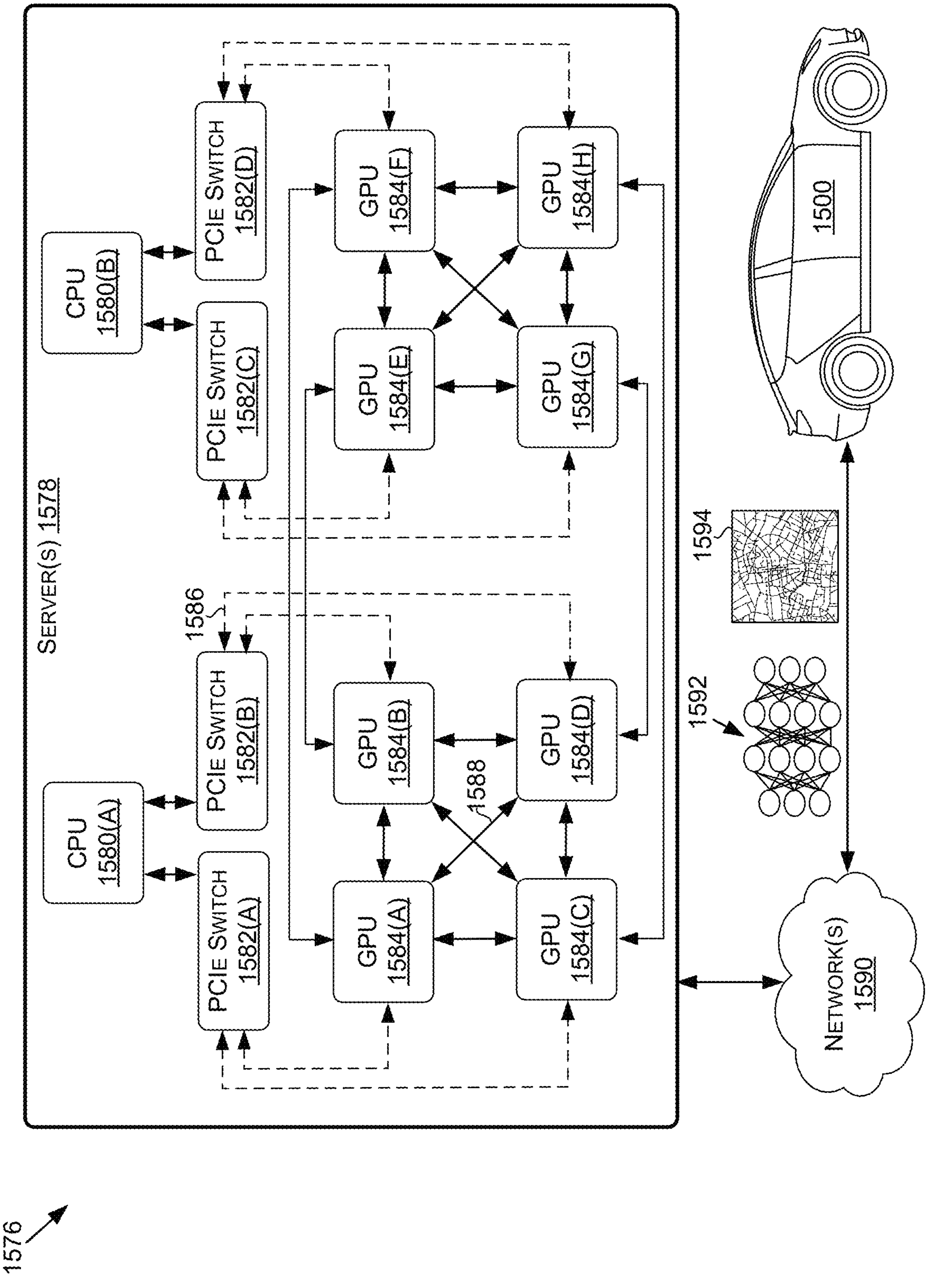
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1584(H) (collectively referred to herein as GPUs 1584), PCIe switches 1582(A)-1582(D) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated using the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Inference and Training Logic

One or more embodiments may be implemented using inference and/or training logic to perform inferencing and/or training operations. Details regarding inference and/or training logic are provided below.

In at least one embodiment, inference and/or training logic may include, without limitation, code and/or data storage to store forward and/or output weight and/or input/output data, and/or other parameters to configure. neurons or layers of a neural network trained and/or used for inferencing in aspects of one or more embodiments. In at least one embodiment, training logic may include, or be coupled to code and/or data storage to store graph code or other software to control timing and/or order, in which weight and/or other parameter information is to be loaded to configure., logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage may be included with other on-chip or off-chip data storage, including a processor's L1, L2, or L3 cache or system memory.

In at least one embodiment, any portion of code and/or data storage may be internal or external to one or more processors or other hardware logic devices or circuits. In at least one embodiment, code and/or data storage may be cache memory, dynamic randomly addressable memory ("DRAM"), static randomly addressable memory ("SRAM"), non-volatile memory (e.g., Flash memory), or other storage. In at least one embodiment, choice of whether code and/or data storage is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic may include, without limitation, a code and/or data storage to store backward and/or output weight and/or input/output data corresponding to neurons or layers of a neural network trained and/or used for inferencing in aspects of one or more embodiments. In at least one embodiment, code and/or data storage stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage to store graph code or other software to control timing and/or order, in which weight and/or other parameter information is to be loaded to configure., logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage may be included with other on-chip or off-chip data storage, including a processor's L1, L2, or L3 cache or system memory. In at least one embodiment, any portion of code and/or data storage may be internal or external to on one or more processors or other hardware logic devices or circuits. In at least one embodiment, code and/or data storage may be cache memory, DRAM, SRAM, non-volatile memory (e.g., Flash memory), or other storage. In at least one embodiment, choice of whether code and/or data storage is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage and code and/or data storage may be separate storage structures. In at least one embodiment, code and/or data storage and code and/or data storage may be same storage structure. In at least one embodiment, code and/or data storage and code and/or data storage may be partially same storage structure and partially separate storage structures. In at least one embodiment, any portion of code and/or data storage and code and/or data storage may be included with other on-chip or off-chip data storage, including a processor's L1, L2, or L3 cache or system memory.

In at least one embodiment, inference and/or training logic may include, without limitation, one or more arithmetic logic unit(s) ("ALU(s)"), including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage that are functions of input/output and/or weight parameter data stored in code and/or data storage and/or code and/or data storage. In at least one embodiment, activations stored in activation storage are generated according to linear algebraic and or matrix-based mathematics performed by ALU(s) in response to performing instructions or other code, wherein weight values stored in code and/or data storage and/or code and/or data storage are used as operands along with other values, such as bias values, gradient information, momentum values, or other parameters or hyperparameters, any or all of which may be stored in code and/or data storage or code and/or data storage or another storage on or off-chip.

In at least one embodiment, ALU(s) are included within one or more processors or other hardware logic devices or circuits, whereas in another embodiment, ALU(s) may be external to a processor or other hardware logic device or circuit that uses them (e.g., a co-processor). In at least one embodiment, ALU(s) may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage, code and/or data storage, and activation storage may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage may be cache memory, DRAM, SRAM, non-volatile memory (e.g., Flash memory), or other storage. In at least one embodiment, activation storage may be completely or partially within or external to one or more processors or other logical circuits. In at least one embodiment, choice of whether activation storage is internal or external to a processor, for example, or comprised of DRAM, SRAM, Hash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit ("CPU") hardware, graphics processing unit ("GPU") hardware or other hardware, such as field programmable gate arrays ("FPGAs").

In at least one embodiment, inference and/or training logic may include, without limitation, hardware logic in which computational resources are dedicated or otherwise exclusively used in conjunction with weight values or other information corresponding to one or more layers of neurons within a neural network. In at least one embodiment, inference and/or training logic may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit (CPU) hardware, graphics processing unit (GPU) hardware or other hardware, such as field programmable gate arrays (FPGAs). In at least one embodiment, inference and/or training logic includes, without limitation, code and/or data storage and code and/or data storage, which may be used to store code (e.g., graph code), weight values and/or other information, including bias values, gradient information, momentum values, and/or other parameter or hyperparameter information. In at least one embodiment, each of code and/or data storage and code and/or data storage is associated with a dedicated computational resource, such as computational hardware and computational hardware. In at least one embodiment, each of computational hardware and computational hardware comprises one or more ALUs that perform mathematical functions, such as linear algebraic functions, only on information stored in code and/or data storage and code and/or data storage, respectively, result of which is stored in activation storage.

In at least one embodiment, each of code and/or data storage and corresponding computational hardware correspond to different layers of a neural network, such that resulting activation from one storage/computational pair of code and/or data storage and computational hardware is provided as an input to storage/computational pair of code and/or data storage and computational hardware, in order to mirror conceptual organization of a neural network. In at least one embodiment, each of storage/computational pairs may correspond to more than one neural network layer. In at least one embodiment, additional storage/computation pairs (not shown) subsequent to or in parallel with storage computation pairs may be included in inference and/or training logic.

Example Computing Device

Figure 16:
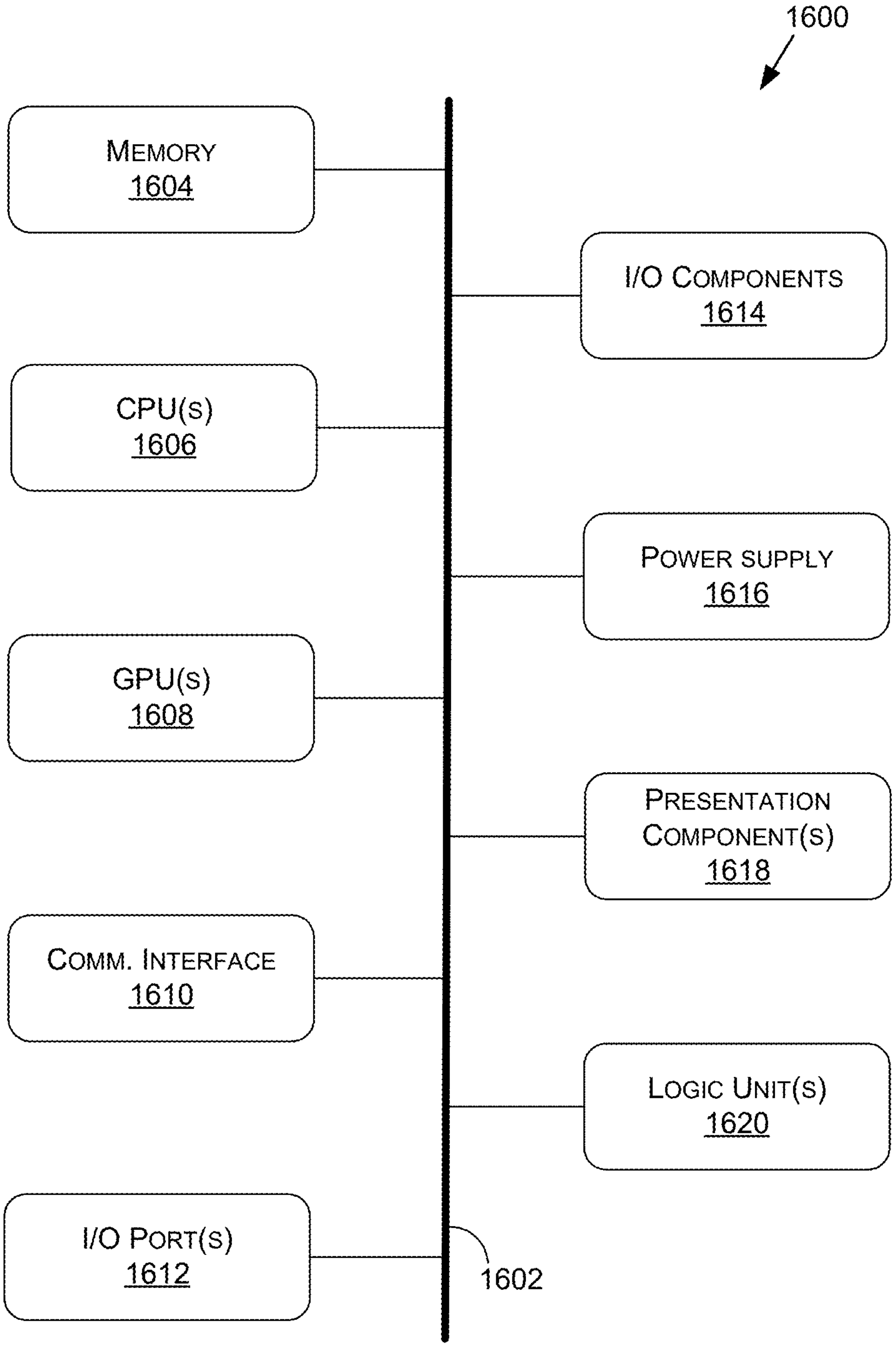
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, one or more presentation components 1618 (e.g., display(s)), and one or more logic units 1620. In at least one embodiment, the computing device(s) 1600 may comprise one or more virtual machines (VMs), and/or any of the components thereof may comprise virtual components (e.g., virtual hardware components). For non-limiting examples, one or more of the GPUs 1608 may comprise one or more vGPUs, one or more of the CPUs 1606 may comprise one or more vCPUs, and/or one or more of the logic units 1620 may comprise one or more virtual logic units. As such, a computing device(s) 1600 may include discrete components (e.g., a full GPU dedicated to the computing device 1600), virtual components (e.g., a portion of a GPU dedicated to the computing device 1600), or a combination thereof.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). As such, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606) and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1610 may include one or more receivers, transmitters, and/or transceivers that allow the computing device 1600 to communicate with other computing devices via an electronic communication network, included wired and/or wireless communications. The communication interface 1610 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1620 and/or communication interface 1610 may include one or more data processing units (DPUs) to transmit data received over a network and/or through interconnect system 1602 directly to (e.g., a memory of) one or more GPU(s) 1608.

The I/O ports 1612 may allow the computing device 1600 to be logically coupled to other devices including the I/O components 1614, the presentation component(s) 1618, and/or other components, some of which may be built in to (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that allow detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to allow the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, DPUs, etc.), and output the data (e.g., as an image, video, sound, etc.).

Example Data Center

Figure 17:
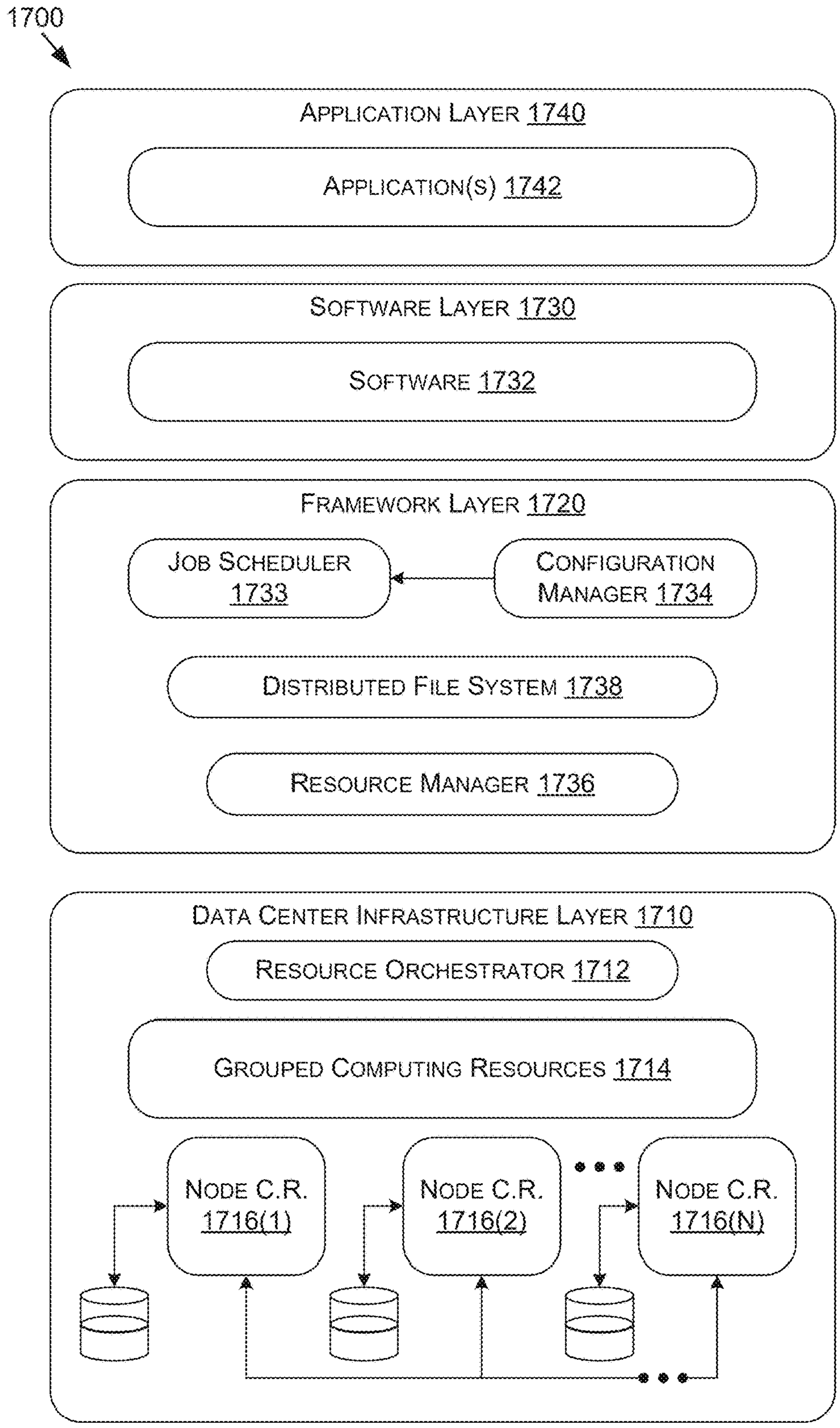
FIG. 17 is a block diagram of an example data center suitable for use in implementing some embodiments of the present disclosure.

FIG. 17 illustrates an example data center 1700 that may be used in at least one embodiments of the present disclosure. The data center 1700 may include a data center infrastructure layer 1710, a framework layer 1720, a software layer 1730, and/or an application layer 1740.

As shown in FIG. 17, the data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1716(1)-1716(N) may correspond to a server having one or more of the above-mentioned computing resources. In addition, in some embodiments, the node C.R.s 1716(1)-17161 (N) may include one or more virtual components, such as vGPUs, vCPUs, and/or the like, and/or one or more of the node C.R.s 1716(1)-1716(N) may correspond to a virtual machine (VM).

In at least one embodiment, grouped computing resources 1714 may include separate groupings of node C.R.s 1716 housed within one or more racks (not shown), or many racks housed in data centers at various geographical locations (also not shown). Separate groupings of node C.R.s 1716 within grouped computing resources 1714 may include grouped compute, network, memory or storage resources that may be configured or allocated to support one or more workloads. In at least one embodiment, several node C.R.s 1716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1712 may configure or otherwise control one or more node C.R.s 1716(1)-1716(N) and/or grouped computing resources 1714. In at least one embodiment, resource orchestrator 1712 may include a software design infrastructure (SDI) management entity for the data center 1700. The resource orchestrator 1712 may include hardware, software, or some combination thereof.

In at least one embodiment, as shown in FIG. 17, framework layer 1720 may include a job scheduler 1733, a configuration manager 1734, a resource manager 1736, and/or a distributed file system 1738. The framework layer 1720 may include a framework to support software 1732 of software layer 1730 and/or one or more application(s) 1742 of application layer 1740. The software 1732 or application(s) 1742 may respectively include web-based service software or applications, such as those provided by Amazon Web Services, Google Cloud and Microsoft Azure. The framework layer 1720 may be, but is not limited to, a type of free and open-source software web application framework such as Apache Spark™ (hereinafter "Spark") that may use distributed file system 1738 for large-scale data processing (e.g., "big data"). In at least one embodiment, job scheduler 1733 may include a Spark driver to facilitate scheduling of workloads supported by various layers of data center 1700. The configuration manager 1734 may be capable of configuring different layers such as software layer 1730 and framework layer 1720 including Spark and distributed file system 1738 for supporting large-scale data processing. The resource manager 1736 may be capable of managing clustered or grouped computing resources mapped to or allocated for support of distributed file system 1738 and job scheduler 1733. In at least one embodiment, clustered or grouped computing resources may include grouped computing resource 1714 at data center infrastructure layer 1710. The resource manager 1736 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716 (1)-1716(N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. Self-modifying actions may relieve a data center operator of data center 1700 from making possibly bad configuration decisions and possibly avoiding underutilized and/or poor performing portions of a data center.

The data center 1700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1700. In at least one embodiment, trained or deployed machine learning models corresponding to one or more neural networks may be used to infer or predict information using resources described above with respect to the data center 1700 by using weight parameters calculated through one or more training techniques, such as but not limited to those described herein.

In at least one embodiment, the data center 1700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1600 of FIG. 16—e.g., each device may include similar components, features, and/or functionality of the computing device(s) 1600. In addition, where backend devices (e.g., servers, NAS, etc.) are implemented, the backend devices may be included as part of a data center 1700, an example of which is described in more detail herein with respect to FIG. 17.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in the appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in an illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably as far as system may embody one or more methods and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although the discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims. The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Literal Support

The disclosure of this application also includes the following numbered clauses:

Clause 1. One or more processors comprising processing circuitry to generate an estimated three-dimensional (3D) representation of a surface in an environment of an ego-machine based at least on fitting one or more height values to one or more sets of LiDAR detections sampled in one or more local neighborhoods along one or more predicted trajectories of the ego-machine.

Clause 2. The one or more processors of clause 1, wherein the processing circuitry is further to control one or more operations of the ego-machine based at least on the estimated 3D representation of the surface.

Clause 3. The one or more processors of clause 1 or 2, wherein the processing circuitry is further to refine one or more ego-motion transforms aligning the LiDAR detections based at least on registering segmented LiDAR points clouds representing one or more static reference surfaces in the environment.

Clause 4. The one or more processors of clause 1 or 2, wherein the processing circuitry is further to refine one or more ego-motion transforms aligning the LiDAR detections based at least on registering LiDAR points clouds segmented based at least on height above an estimated ground surface.

Clause 5. The one or more processors of clause 1 or 2, wherein the processing circuitry is further to refine one or more ego-motion transforms aligning the LiDAR detections based at least on registering segmented LiDAR points clouds that remove one or more points in a band of heights above an estimated ground surface.

Clause 6. The one or more processors of clause 1 or 2, wherein the processing circuitry is further to refine one or more ego-motion transforms aligning the LiDAR detections based at least on estimating pitch relative to an estimated ground surface.

Clause 7. The one or more processors of clause 1 or 2, wherein the processing circuitry is further to sample a set of trajectory points along the one or more predicted trajectories, and sample the one or more sets of LiDAR detections within one or more designated 3D radii of at least one individual trajectory point of the set of trajectory points.

Clause 8. The one or more processors of clause 1 or 2, wherein the processing circuitry is further to sample the one or more sets of LiDAR detections within a direction-dependent 3D radius of at least one individual trajectory point of the one or more predicted trajectories.

Clause 9. The one or more processors of clause 1 or 2, wherein the fitting of the one or more height values applies a nonlinear optimization to observed height values of the one or more sets of LiDAR detections sampled in at least one individual local neighborhood of the one or more local neighborhoods.

Clause 10. The one or more processors of clause 1 or 2, wherein the fitting of the one or more height values applies a one-dimensional (1D) nonlinear optimization to observed height values of the one or more sets of LiDAR detections sampled along the one or more predicted trajectories.

Clause 11. The one or more processors of clause 1 or 2, wherein the one or more operations of the ego-machine comprise at least one of adapting a suspension system, generating a path that avoids a protuberance, or applying an acceleration or deceleration based at least on the estimated 3D representation of the surface.

Clause 12. The one or more processors of clause 1 or 2, wherein the one or more processors are comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 13. A method comprising generating an estimated three-dimensional (3D) representation of a road surface in an environment of an ego-machine based at least on fitting one or more height values to one or more sets of LiDAR detections sampled in one or more local neighborhoods along one or more predicted trajectories of the ego-machine.

Clause 14. The method of clause 13, further comprising controlling one or more operations of the ego-machine based at least on the estimated 3D representation of the road surface.

Clause 15. The method of clause 13 or 14, further comprising sampling a set of trajectory points along the one or more predicted trajectories, and sampling the one or more sets of LiDAR detections within one or more designated 3D radii of at least one individual trajectory point of the set of trajectory points.

Clause 16. The method of clause 13 or 14, wherein the fitting of the one or more height values applies a nonlinear optimization to observed height values of the one or more sets of LiDAR detections sampled in at least one individual local neighborhood of the one or more local neighborhoods.

Clause 17. The method of clause 13 or 14, wherein the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs);

a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 18. A system comprising one or more processors to control, within a simulation rendered using one or more light transport simulation algorithms, one or more operations of an ego-machine in a simulated environment based at least on an estimated three-dimensional (3D) representation of a road surface in the simulated environment, the 3D representation of the road surface generated based at least on fitting one or more height values to one or more sets of simulated LiDAR detections sampled in one or more local neighborhoods along one or more predicted trajectories of the ego-machine.

Clause 19. The system of clause 18, wherein the simulation is generated, at least in part, using one or more content creation applications of a three-dimensional (3D) content collaboration platform for 3D assets.

Clause 20. The system of clause 19, wherein the simulated environment is represented in at least one content creation application of the one or more content creation applications using an OpenUSD format.

Clause 21. The system of clause 18, wherein the wherein the fitting of the one or more height values applies a nonlinear optimization to simulated height values of the one or more sets of simulated LiDAR detections sampled in at least one individual local neighborhood of the one or more local neighborhoods.

Clause 22. The system of clause 18, wherein at least one of the processors is implemented in at least one processing node of a plurality of processing nodes of a data center and accessible to one or more remote clients via at least one of an application programming interface (API), or an application plug-in.

Clause 23. One or more processors comprising processing circuitry to generate one or more LiDAR detections using one or more LiDAR sensors of an ego-machine.

Clause 24. The one or more processors of clause 23, wherein the processing circuitry is further to look up one or more estimated height offsets corresponding to at least one of one or more measured range values or one or more measured reflectivity values of the one or more LiDAR detections.

Clause 25. The one or more processors of clause 23 or 24, wherein the processing circuitry is further to generate one or more bias-corrected LiDAR detections based at least on removing the one or more estimated height offsets from one or more measured height values of the one or more LiDAR detections.

Clause 26. The one or more processors of clause 23, 24 or 25, wherein the processing circuitry is further to control one or more operations of the ego-machine based at least on the one or more bias-corrected LiDAR detections.

Clause 27. The one or more processors of clause 23, 24, 25 or 26, wherein the one or more estimated height offsets comprise one or more range-dependent height offsets.

Clause 28. The one or more processors of clause 23, 24, 25 or 26, wherein the one or more estimated height offsets comprise one or more reflectivity-dependent height offsets.

Clause 29. The one or more processors of clause 23, 24, 25 or 26, wherein the processing circuitry is further to look up the one or more estimated height offsets from one or more data structures that bin the one or more estimated height offsets based at least on measurement range.

Clause 30. The one or more processors of clause 23, 24, 25 or 26, wherein the processing circuitry is further to look up the one or more estimated height offsets from one or more data structures that bin the one or more estimated height offsets based at least on reflectivity.

Clause 31. The one or more processors of clause 23, 24, 25 or 26, wherein the processing circuitry is further to generate one or more range-dependent height offsets of the one or more estimated height offsets based at least on subtracting a ground truth height of a local neighborhood of a ground surface from an aggregate observed height of accumulated LiDAR measurements of the local neighborhood binned based on measurement range.

Clause 32. The one or more processors of clause 23, 24, 25 or 26, wherein the processing circuitry is further to generate one or more reflectivity-dependent height offsets of the one or more estimated height offsets based at least on subtracting one or more ground truth heights of a ground surface from an aggregate height of accumulated LiDAR detections binned based on measured reflectivity.

Clause 33. The one or more processors of clause 23, 24, 25 or 26, wherein the processing circuitry is further to generate the one or more estimated height offsets based at least on designating an aggregate observed height of accumulated LiDAR detections that were measured within a designated measurement range as ground truth height.

Clause 34. The one or more processors of clause 23, 24, 25 or 26, wherein the processing circuitry is further to generate an estimated three-dimensional (3D) representation of a surface in an environment based at least on the one or more bias-corrected LiDAR detections.

Clause 35. The one or more processors of clause 23, 24, 25 or 26, wherein the one or more processors are comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 36. A method comprising generating one or more LiDAR detections using one or more LiDAR sensors.

Clause 37. The method of clause 36, further comprising generating one or more bias-corrected LiDAR detections based at least on removing, from one or more measured height values of the one or more LiDAR detections, one or more estimated height biases corresponding to at least one of one or more measured range values or one or more measured reflectivity values of the one or more LiDAR detections.

Clause 38. The method of clause 36 or 37, wherein the one or more estimated height biases comprise one or more range-dependent height biases.

Clause 39. The method of clause 36 or 37, wherein the one or more estimated height biases comprise one or more reflectivity-dependent height biases.

Clause 40. The method of clause 36 or 37, further comprising looking up the one or more estimated height biases from one or more data structures that bin the one or more estimated height biases based at least on measurement range.

Clause 41. The method of clause 36 or 37, further comprising looking up the one or more estimated height biases from one or more data structures that bin the one or more estimated height biases based at least on reflectivity.

Clause 42. The method of clause 36 or 37, wherein the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 43. A system comprising one or more processors to control, within a simulation rendered using one or more light transport simulation algorithms, one or more operations of an ego-machine in a simulated environment based at least on one or more bias-corrected LiDAR detections, the one or more bias-corrected LiDAR detections generated based at least on removing, from one or more height values of one or more simulated LiDAR detections generated using one or more simulated LiDAR sensors, one or more estimated height biases corresponding to at least one of one or more range values or one or more reflectivity values of the one or more simulated LiDAR detections.

Clause 44. The system of clause 43, wherein the simulation is generated, at least in part, using one or more content creation applications of a three-dimensional (3D) content collaboration platform for 3D assets.

Clause 45. The system of clause 44, wherein the simulated environment is represented in at least one content creation application of the one or more content creation applications using an OpenUSD format.

Clause 46. The system of clause 43, wherein at least one of the one or more processors is implemented in at least one processing node of a plurality of processing nodes of a data center and accessible to one or more remote clients via at least one of an application programming interface (API), or an application plug-in.

Clause 47. One or more processors comprising processing circuitry to generate a surface disparity field representing estimated disparity values of a surface in an environment of an ego-machine based at least on processing a representation of stereo image data corresponding to the environment using a nonlinear hierarchical optimization.

Clause 48. The one or more processors of clause 47, wherein the processing circuitry is further to control one or more operations of the ego-machine based at least on the surface disparity field of the surface.

Clause 49. The one or more processors of clause 47 or 48, wherein the processing circuitry is further to generate the surface disparity field based at least on one or more weights that encourage the nonlinear hierarchical optimization to converge to smaller disparities.

Clause 50. The one or more processors of clause 47 or 48, wherein the processing circuitry is further to generate the surface disparity field using one or more weights that emphasize disparity values based at least on proximity to an estimated trajectory of the ego-machine.

Clause 51. The one or more processors of clause 47 or 48, wherein the processing circuitry is further to generate the surface disparity field using one or more weights that deemphasize disparity values below a detected horizon based at least on proximity to the detected horizon.

Clause 52. The one or more processors of clause 47 or 48, wherein the processing circuitry is further to generate the surface disparity field based at least on a measurement deviation weight that penalizes deviation between stereo disparity values and the estimated disparity values of the surface.

Clause 53. The one or more processors of clause 47 or 48, wherein the processing circuitry is further to generate the surface disparity field based at least on deviation between stereo disparity values of a pyramid of stereo disparity layers and the estimated disparity values of the surface.

Clause 54. The one or more processors of clause 47 or 48, wherein the processing circuitry is further to generate the surface disparity field based at least on one or more weights that emphasize disparity values that correspond to higher intensity gradient consistency in the stereo image data.

Clause 55. The one or more processors of clause 47 or 48, wherein the processing circuitry is further to generate the surface disparity field based at least on a measurement deviation weight that penalizes deviation between optically refined stereo disparity values and the estimated disparity values of the surface.

Clause 56. The one or more processors of clause 47 or 48, wherein the processing circuitry is further to generate the surface disparity field based at least on upsampling optically refined stereo disparity values and the estimated disparity values of the surface in the nonlinear hierarchical optimization.

Clause 57. The one or more processors of clause 47 or 48, wherein the one or more processors are comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 58. A method comprising generating a ground disparity field representing estimated disparity values of a ground surface in an environment of an ego-machine based at least on processing a representation of stereo image data corresponding to the environment using a nonlinear hierarchical optimization.

Clause 59. The method of clause 58, further comprising controlling one or more operations of the ego-machine based at least on the ground disparity field.

Clause 60. The method of clause 58 or 59, further comprising generating the ground disparity field based at least on one or more weights that encourage the nonlinear hierarchical optimization to converge to smaller disparities.

Clause 61. The method of clause 58 or 59, further comprising generating the ground disparity field using one or more weights that emphasize disparity values based at least on proximity to an estimated trajectory of the ego-machine.

Clause 62. The method of clause 58 or 59, further comprising generating the ground disparity field using one or more weights that deemphasize disparity values below a detected horizon based at least on proximity to the detected horizon.

Clause 63. The method of clause 58 or 59, wherein the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 64. A system comprising one or more processors to control, within a simulation rendered using one or more light transport simulation algorithms, one or more operations of an ego-machine in a simulated environment based at least on a ground disparity field representing estimated disparity values of a ground surface in the simulated environment, the ground disparity field generated based at least on processing a representation of stereo image data corresponding to the simulated environment using a nonlinear hierarchical optimization.

Clause 65. The system of clause 64, wherein the simulation is generated, at least in part, using one or more content creation applications of a three-dimensional (3D) content collaboration platform for 3D assets.

Clause 66. The system of clause 65, wherein the simulated environment is represented in at least one content creation application of the one or more content creation applications using an OpenUSD format.

Clause 67. The system of clause 64, wherein the one or more processors are further to generate the ground disparity field based at least on one or more weights that encourage the nonlinear hierarchical optimization to converge to smaller disparities.

Clause 68. The system of clause 64, wherein at least one of the processors is implemented in at least one processing node of a plurality of processing nodes of a data center and accessible to one or more remote clients via at least one of an application programming interface (API), or an application plug-in.

Clause 69. One or more processors comprising processing circuitry to generate, based at least on a representation of stereo image data corresponding to an environment of an ego-machine, a surface disparity field representing estimated disparity values of a surface in the environment.

Clause 70. The one or more processors of clause 69, wherein the processing circuitry is further to control one or more operations of the ego-machine based at least on the surface disparity field of the surface.

Clause 71. The one or more processors of clause 69 or 70, wherein the one or more operations comprise detecting one or more obstacles based at least on applying a range-dependent threshold height to a difference between lifted representations of the surface disparity field and a stereo disparity field corresponding to the representation of the stereo image data.

Clause 72. The one or more processors of clause 69 or 70, wherein the one or more operations comprise detecting one or more obstacles based at least on applying a range-dependent threshold difference in disparity between the surface disparity field and a stereo disparity field corresponding to the representation of the stereo image data.

Clause 73. The one or more processors of clause 69 or 70, wherein the one or more operations comprise controlling navigation of the ego-machine based on at least one of: a) determining that one or more obstacles are represented by one or more clusters of the surface disparity field that satisfy a designated threshold, or b) determining that one or more obstacles detected based at least on the surface disparity field appear in at least a threshold number of frames.

Clause 74. The one or more processors of clause 69 or 70, wherein the one or more operations comprise generating a representation of a navigable space based at least on radially casting two-dimensional (2D) rays in a representation of the surface disparity field from a reference point to one or more points corresponding to one or more disparity differences that are at least a designated threshold.

Clause 75. The one or more processors of clause 69 or 70, wherein the one or more operations comprise refining one or more estimated ego-motion transforms aligning LiDAR detections based at least on registering lifted representations of the surface disparity field from successive frames.

Clause 76. The one or more processors of clause 69 or 70, wherein the one or more operations comprise generating an estimated three-dimensional (3D) representation of a surface in the environment based at least on the surface disparity field.

Clause 77. The one or more processors of clause 69 or 70, wherein the one or more operations comprise generating an estimated three-dimensional (3D) representation of a surface in the environment based at least on sampling, along one or more predicted trajectories of the ego-machine, one or more detections generated based on lifting the surface disparity field to 3D.

Clause 78. The one or more processors of clause 69 or 70, wherein the one or more processors are comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 79. A method comprising controlling one or more operations of an ego-machine in an environment based at least on a ground disparity field representing estimated disparity values of a ground surface in the environment.

Clause 80. The method of clause 79, wherein the one or more operations comprise controlling navigation of the ego-machine based on at least one of: a) determining that one or more obstacles are represented by one or more clusters of the ground disparity field that satisfy a designated threshold, or b) determining that one or more obstacles detected based at least on the ground disparity field appear in at least a threshold number of frames.

Clause 81. The method of clause 79, wherein the one or more operations comprise generating a representation of a navigable space based at least on radially casting two-dimensional (2D) rays in a representation of the ground disparity field from a reference point to one or more points corresponding to one or more disparity differences that are at least a designated threshold.

Clause 82. The method of clause 79, wherein the one or more operations comprise refining one or more estimated ego-motion transforms aligning LiDAR detections based at least on registering lifted representations of the ground disparity field from successive frames.

Clause 83. The method of clause 79, wherein the one or more operations comprise generating an estimated three-dimensional (3D) representation of a ground surface in the environment based at least on the ground disparity field.

Clause 84. The method of clause 79, wherein the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system for performing one or more generative AI operations; a system incorporating one or more virtual machines (VMs); a system implemented at least partially in a data center; or a system implemented at least partially using cloud computing resources.

Clause 85. A system comprising one or more processors to control, within a simulation rendered using one or more light transport simulation algorithms, one or more operations of an ego-machine in a simulated environment based at least on a ground disparity field representing estimated disparity values of a ground surface in the simulated environment.

Clause 86. The system of clause 85, wherein the simulation is generated, at least in part, using one or more content creation applications of a three-dimensional (3D) content collaboration platform for 3D assets.

Clause 87. The system of clause 86, wherein the simulated environment is represented in at least one content creation application of the one or more content creation applications using an OpenUSD format.

Clause 88. The system of clause 85, wherein the one or more processors are further to generate the ground disparity field based at least on a representation of stereo image data representing the simulated environment.

Clause 89. The system of clause 85, wherein at least one of the processors is implemented in at least one processing node of a plurality of processing nodes of a data center and accessible to one or more remote clients via at least one of an application programming interface (API), or an application plug-in.

What is claimed is:

1. One or more processors comprising processing circuitry to:

generate a surface disparity field representing estimated disparity values of a surface in an environment of an ego-machine based at least on processing a representation of stereo image data corresponding to the environment using a nonlinear hierarchical optimization; and control motion of the ego-machine based at least on the surface disparity field of the surface.

2. The one or more processors of claim 1, wherein the processing circuitry is further to generate the surface disparity field based at least on one or more weights that encourage the nonlinear hierarchical optimization to converge to smaller disparities.

3. The one or more processors of claim 1, wherein the processing circuitry is further to generate the surface disparity field using one or more weights that emphasize disparity values based at least on proximity to an estimated trajectory of the ego-machine.

4. The one or more processors of claim 1, wherein the processing circuitry is further to generate the surface disparity field using one or more weights that deemphasize disparity values below a detected horizon based at least on proximity to the detected horizon.

5. The one or more processors of claim 1, wherein the processing circuitry is further to generate the surface disparity field based at least on a measurement deviation weight that penalizes deviation between stereo disparity values and the estimated disparity values of the surface.

6. The one or more processors of claim 1, wherein the processing circuitry is further to generate the surface disparity field based at least on deviation between stereo disparity values of a pyramid of stereo disparity layers and the estimated disparity values of the surface.

7. The one or more processors of claim 1, wherein the processing circuitry is further to generate the surface disparity field based at least on one or more weights that emphasize disparity values that correspond to higher intensity gradient consistency in the stereo image data.

8. The one or more processors of claim 1, wherein the processing circuitry is further to generate the surface disparity field based at least on a measurement deviation weight that penalizes deviation between optically refined stereo disparity values and the estimated disparity values of the surface.

9. The one or more processors of claim 1, wherein the processing circuitry is further to generate the surface disparity field based at least on upsampling optically refined stereo disparity values and the estimated disparity values of the surface in the nonlinear hierarchical optimization.

10. The one or more processors of claim 1, wherein the one or more processors are comprised in at least one of:

- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for performing remote operations;
- a system for performing real-time streaming;
- a system for generating or presenting one or more of augmented reality content, virtual reality content, or mixed reality content;
- a system implemented using an edge device;
- a system implemented using a robot;
- a system for performing conversational AI operations;
- a system implementing one or more language models;
- a system implementing one or more large language models (LLMs);
- a system implementing one or more vision language models (VLMs);
- a system implementing one or more multi-modal language models;
- a system for generating synthetic data;
- a system for generating synthetic data using AI;
- a system for performing one or more generative AI operations;
- a system incorporating one or more virtual machines (VMs);
- a system implemented at least partially in a data center; or
- a system implemented at least partially using cloud computing resources.

11. A method comprising:

generating a ground disparity field representing estimated disparity values of a ground surface in an environment of an ego-machine based at least on processing a representation of stereo image data corresponding to the environment using a nonlinear hierarchical optimization; and controlling motion of the ego-machine based at least on the ground disparity field.

12. The method of claim 11, further comprising generating the ground disparity field based at least on one or more weights that encourage the nonlinear hierarchical optimization to converge to smaller disparities.

13. The method of claim 11, further comprising generating the ground disparity field using one or more weights that emphasize disparity values based at least on proximity to an estimated trajectory of the ego-machine.

14. The method of claim 11, further comprising generating the ground disparity field using one or more weights that deemphasize disparity values below a detected horizon based at least on proximity to the detected horizon.

15. The method of claim 11, wherein the method is performed by at least one of:

- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for performing remote operations;
- a system for performing real-time streaming;
- a system for generating or presenting one or more of augmented reality content, virtual reality content, or mixed reality content;
- a system implemented using an edge device;
- a system implemented using a robot;
- a system for performing conversational AI operations;
- a system implementing one or more language models;
- a system implementing one or more large language models (LLMs);
- a system implementing one or more vision language models (VLMs);
- a system implementing one or more multi-modal language models;
- a system for generating synthetic data;
- a system for generating synthetic data using AI;
- a system for performing one or more generative AI operations;
- a system incorporating one or more virtual machines (VMs);
- a system implemented at least partially in a data center; or
- a system implemented at least partially using cloud computing resources.

16. An autonomous or semi-autonomous machine comprising:

one or more systems-on-a-chip (SoCs) individually comprising one or more central processing units (CPUs), one or more graphics processing units (GPUs), and one or more hardware accelerators; and one or more sensors having fields of view or sensory fields of an environment external to the autonomous or semi-autonomous machine, wherein the one or more SoCs are to control motion of the autonomous or semi-autonomous machine based at least on a ground disparity field representing estimated disparity values of a ground surface in the environment, the ground disparity field generated based at least on processing a representation of stereo image data corresponding to the one or more sensors using a nonlinear hierarchical optimization.

17. The autonomous or semi-autonomous machine of claim 16, wherein the one or more hardware accelerators include at least one of a vision accelerator, a ray-tracing accelerator, an optical flow accelerator, or a deep learning accelerator.

18. The autonomous or semi-autonomous machine of claim 17, wherein the autonomous or semi-autonomous machine includes a vehicle, a car, a truck, a robot, a warehouse vehicle, a drone, a watercraft, or an aircraft.

19. The autonomous or semi-autonomous machine of claim 16, wherein the one or more SoCs are further to generate the ground disparity field based at least on one or more weights that encourage the nonlinear hierarchical optimization to converge to smaller disparities.

20. The autonomous or semi-autonomous machine of claim 16, wherein the autonomous or semi-autonomous machine includes or uses at least one of:

a control system or a perception system;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system implementing one or more vision language models (VLMs);

a system implementing one or more multi-modal language models;

a system for generating synthetic data;

a system for generating synthetic data using AI;

a system for performing one or more generative AI operations;

a system incorporating one or more virtual machines (VMs);

a system implemented at least partially in a data center; or a system implemented at least partially using cloud computing resources.

* * * * *